United States Patent [19]
Williamson

[11] Patent Number: 4,813,126
[45] Date of Patent: Mar. 21, 1989

[54] APPARATUS AND METHOD FOR FABRICATING MAGNETIC DEVICES

[75] Inventor: James A. Williamson, Orange County, Calif.

[73] Assignee: Williamson Windings Inc., Santa Ana, Calif.

[21] Appl. No.: 80,743

[22] Filed: Jul. 31, 1987

Related U.S. Application Data

[63] Continuation of Ser. No. 914,552, Oct. 1, 1986, abandoned, which is a continuation of Ser. No. 769,614, Aug. 26, 1985, abandoned.

[51] Int. Cl.$^4$ .................... B23P 23/00; B21D 11/08; B21F 3/027
[52] U.S. Cl. ........................ 29/729; 29/605; 73/136; 73/137
[58] Field of Search .............. 29/173, 605, 609, 610, 29/611, 729, 736, 742; 72/130, 132, 135, 136, 137, 183; 83/300, 341, 342, 672; 140/71.5, 103, 104; 267/179; 336/183, 223, 225

[56] References Cited

U.S. PATENT DOCUMENTS

| | | | |
|---|---|---|---|
| 267,138 | 11/1882 | Blanchard | 336/223 X |
| 368,569 | 8/1887 | Caldwell | 72/136 |
| 781,760 | 2/1905 | Bergmann | 72/183 |
| 999,749 | 8/1911 | Chubb | 336/223 X |
| 1,723,840 | 8/1929 | Burnham | 336/183 X |
| 1,801,214 | 4/1931 | Von Henke | 336/223 |
| 1,852,805 | 4/1932 | Frank | 336/183 X |
| 2,336,602 | 12/1943 | Fulson | 72/136 |
| 2,960,757 | 11/1960 | Epstein | 29/611 |
| 3,271,716 | 9/1966 | Furth | 336/223 X |
| 3,283,399 | 11/1966 | Hart et al. | 29/605 |
| 3,341,917 | 9/1967 | Oyabu et al. | 29/605 |
| 3,576,120 | 4/1971 | Le Vasseur | 72/132 X |
| 3,702,387 | 11/1972 | Klein | 29/611 X |
| 4,362,990 | 12/1982 | Schneider et al. | 336/212 X |
| 4,542,635 | 9/1985 | Matsuoka | 72/137 X |

FOREIGN PATENT DOCUMENTS

| | | | |
|---|---|---|---|
| 239828 | 8/1962 | Australia | 267/179 |
| 895070 | 3/1944 | France | 83/672 |
| 1578613 | 8/1969 | France | 336/223 |
| 488264 | 5/1970 | Switzerland | 336/223 |
| 197711 | 11/1977 | U.S.S.R. | 336/183 |
| 963648 | 2/1983 | U.S.S.R. | 140/103 |

Primary Examiner—E. Micheal Combs
Attorney, Agent, or Firm—James F. Kirk; W. G. Caldwell

[57] ABSTRACT

The invention comprises apparatus for forming nelical coils from conductive strip metal, counting the turns and cutting them to separate the turns into coils of desired numbers of turns, annealing the coils, tabbing the ends thereof, coating the coils with insulative coating and curing the coating by baking; compressing the so-insulated coils under extreme pressure to comprise a helical coil product, per se, or to fit conventional cores to comprise an inductor product.

18 Claims, 20 Drawing Sheets

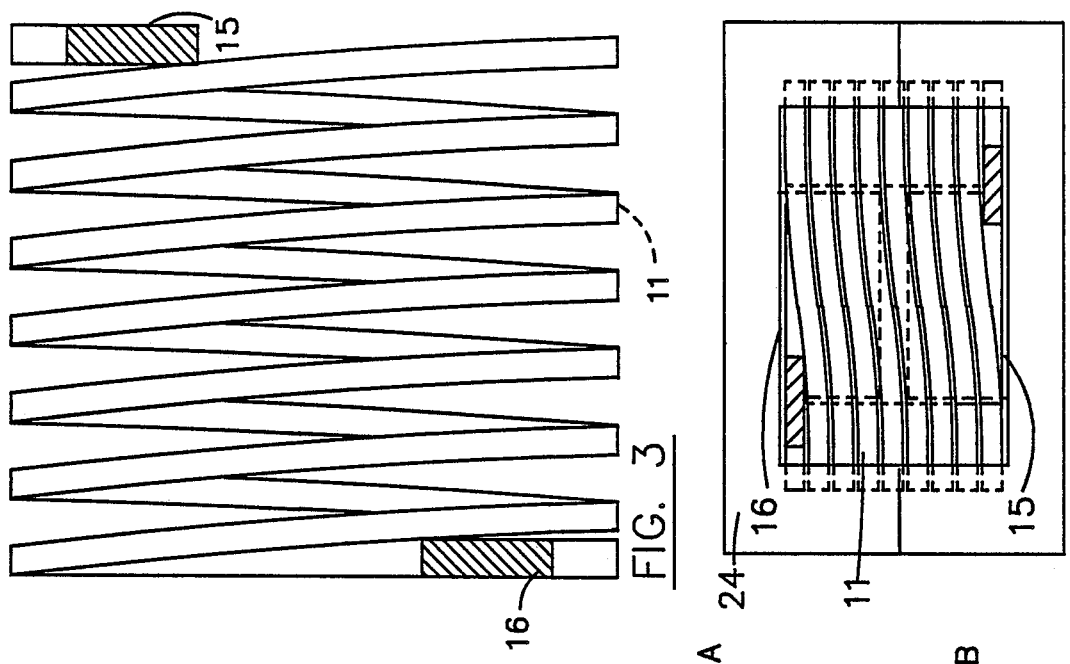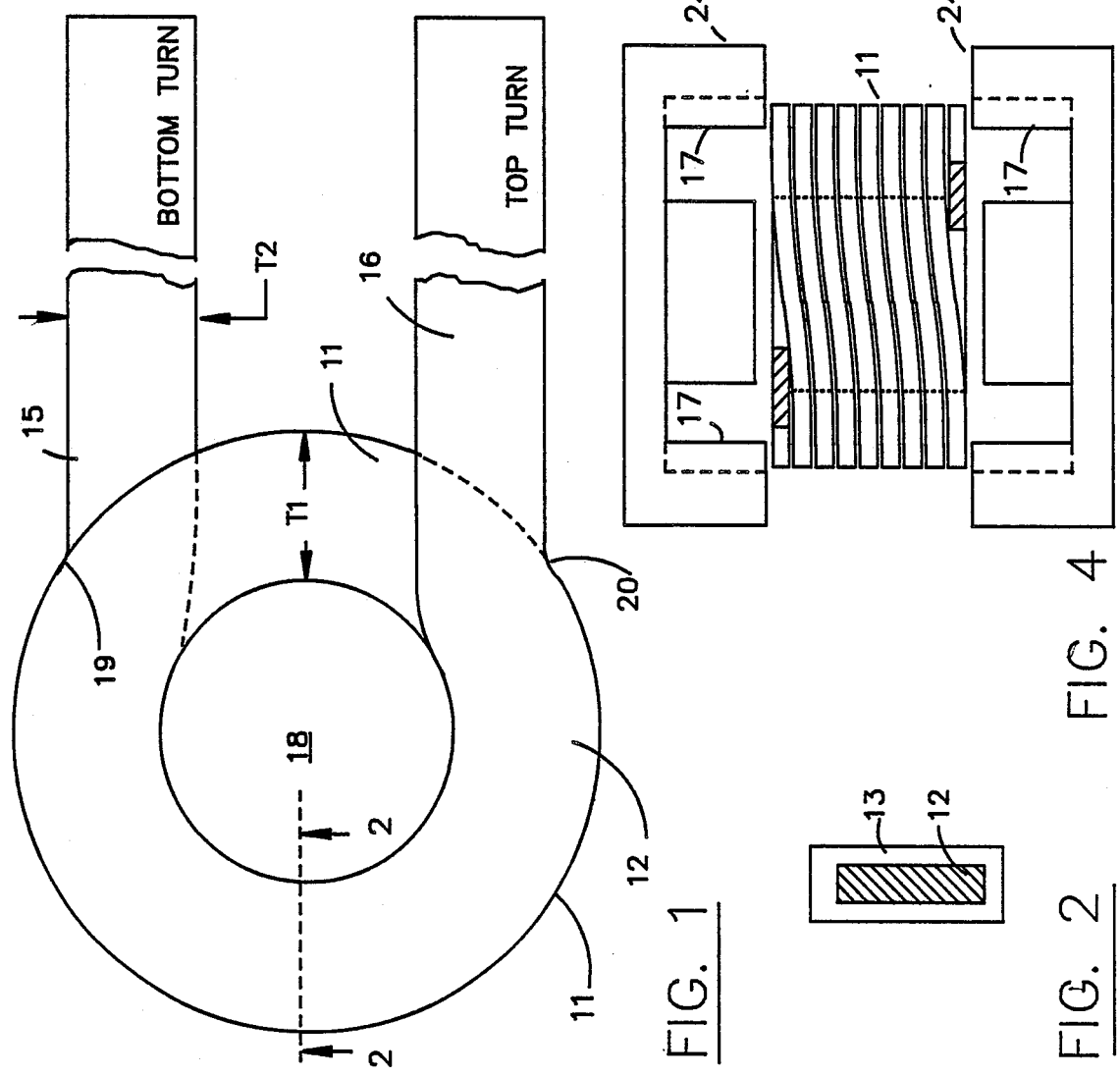

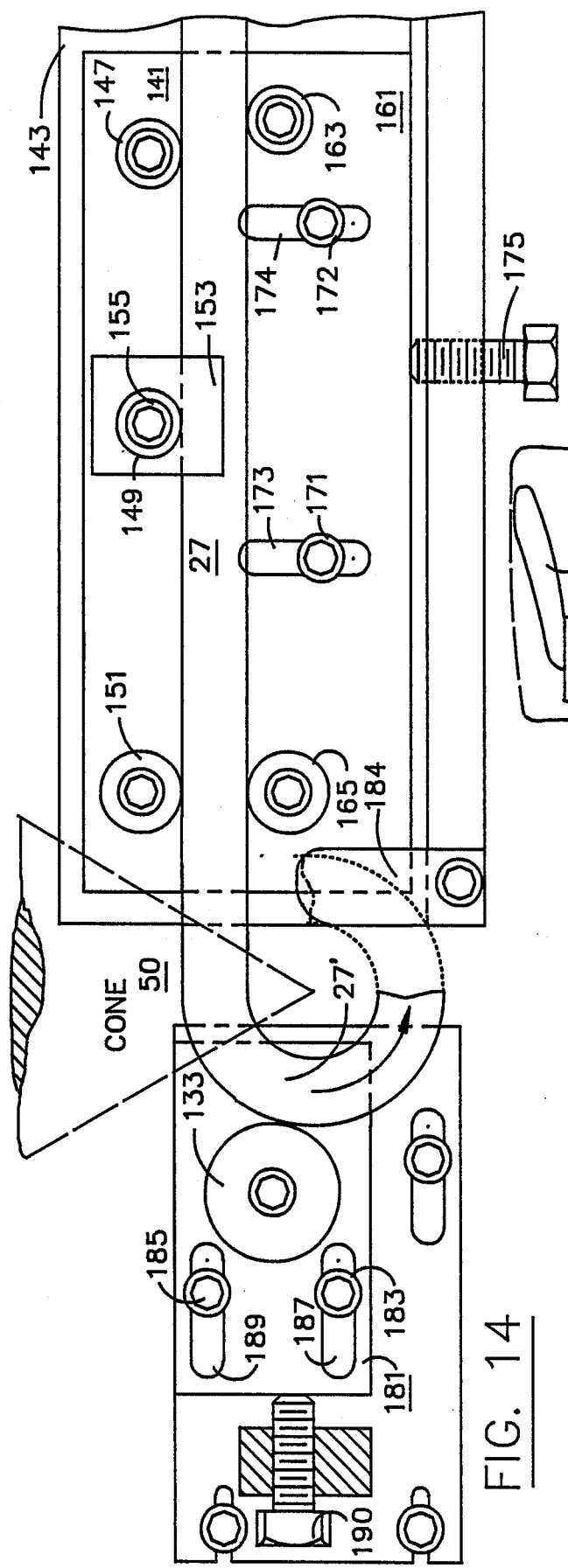
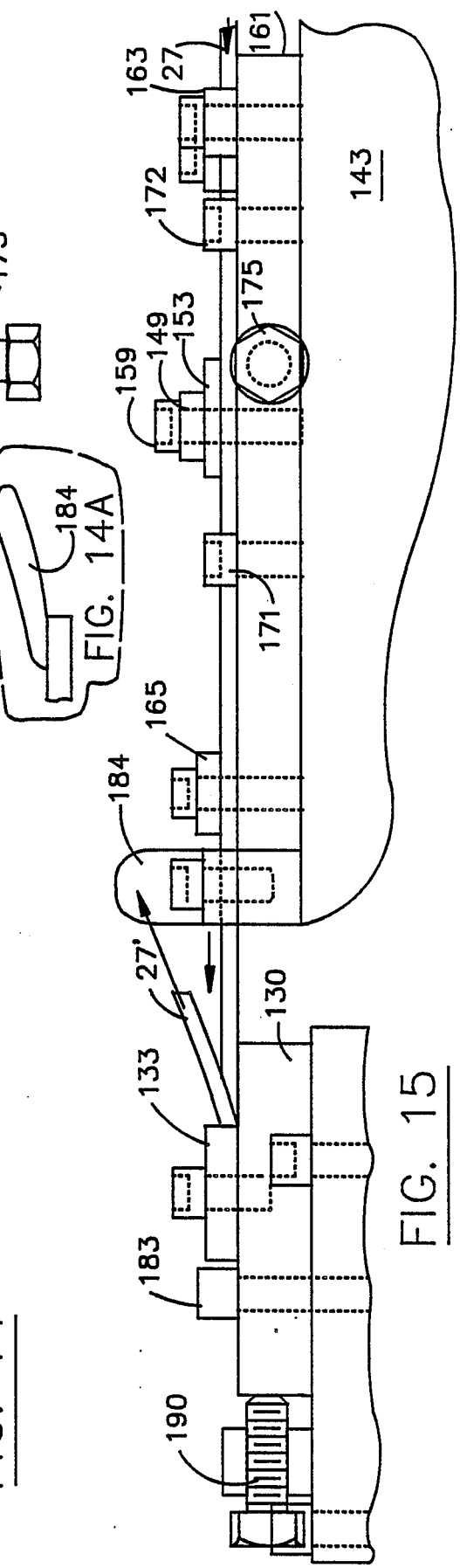
FIG. 14
FIG. 14A
FIG. 15

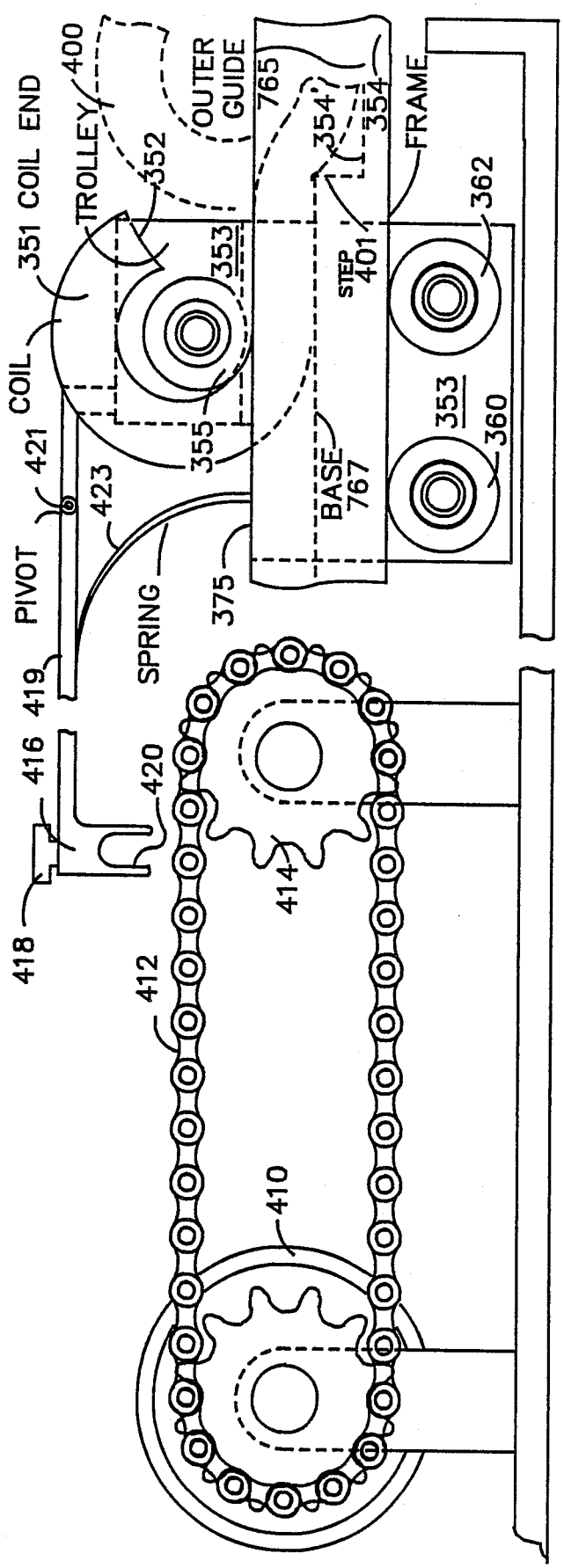
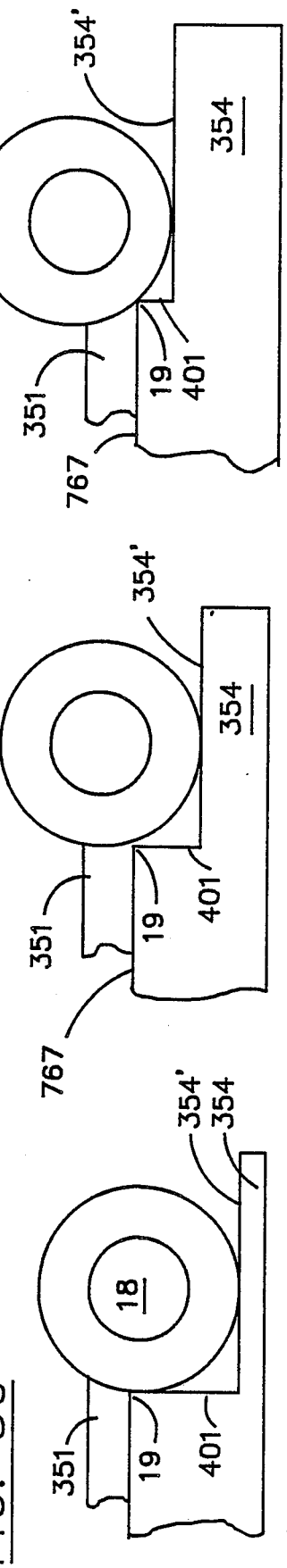
FIG. 30
FIG. 31A
FIG. 31B
FIG. 31C

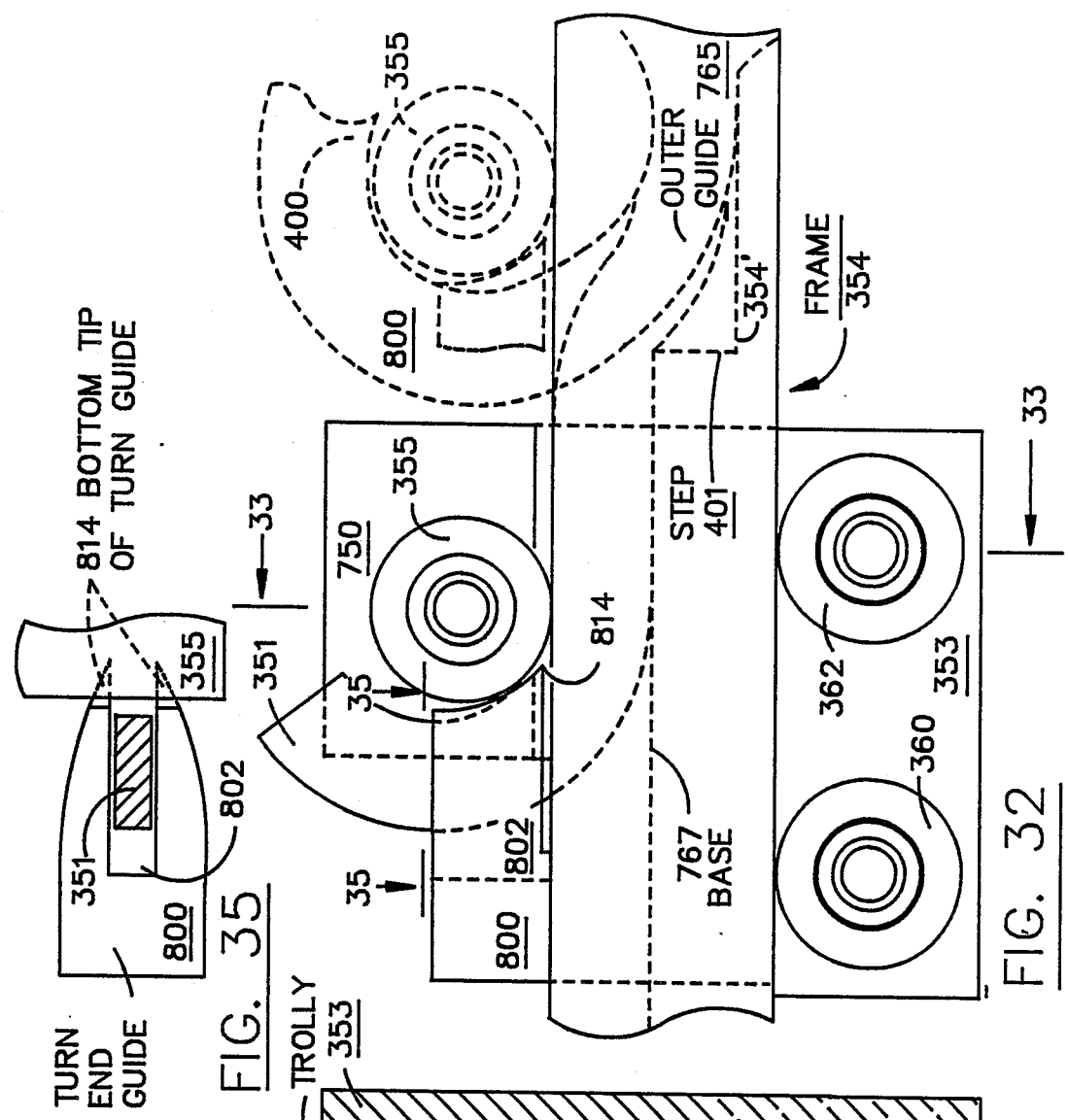
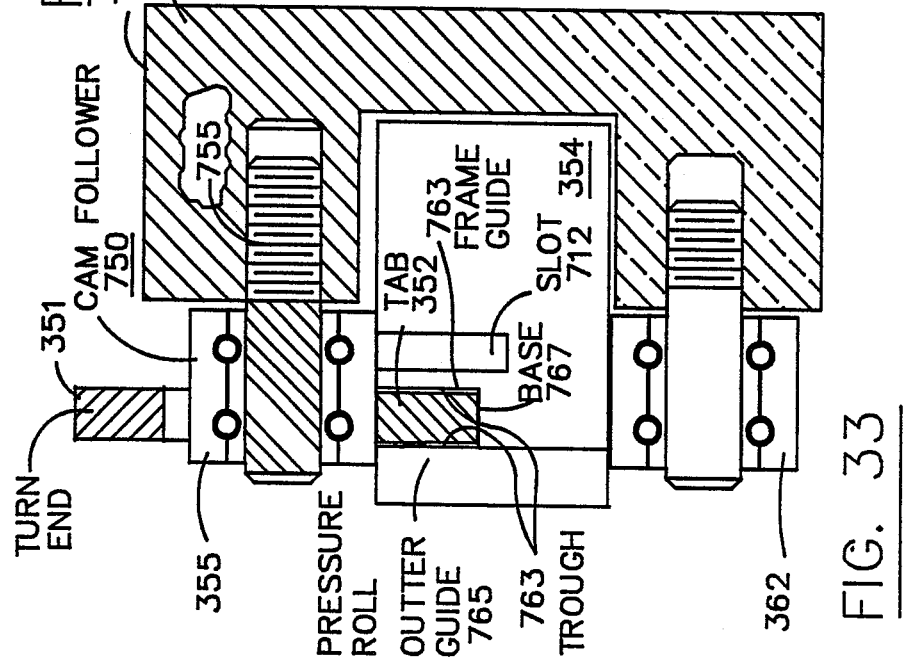

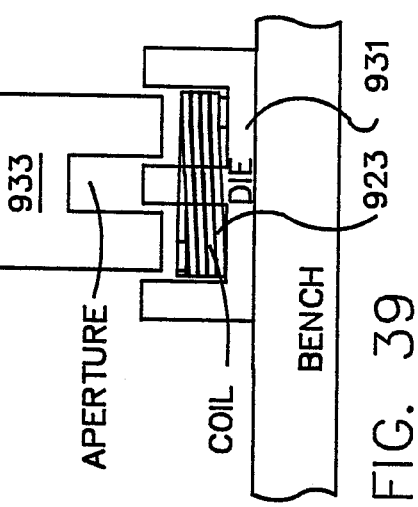
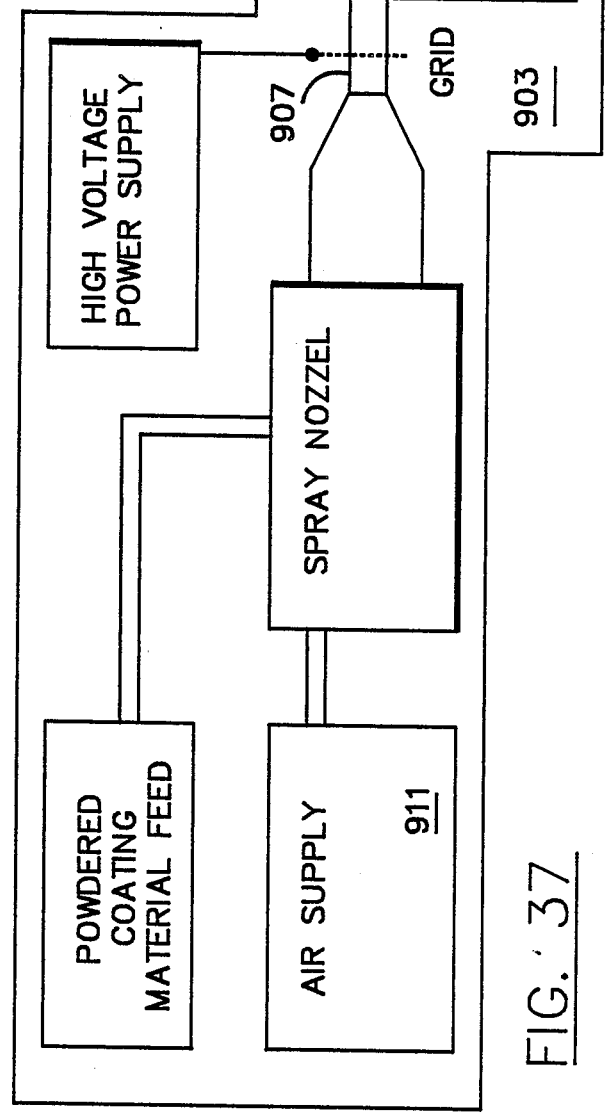

APPARATUS AND METHOD FOR FABRICATING MAGNETIC DEVICES

This application is a continuation of application Ser. No. 914,552, filed Oct. 1, 1986, abandoned, which in turn is a continuation of application Ser. No. 769,614, filed Aug. 26, 1985, abandoned.

CROSS REFERENCES TO RELATED APPLICATION:

1. Magnetic Core Inductor, by the same inventor, filed 5-28-85 as U.S. Ser. No. 738360, and assigned to the same assignee, abandoned.
2. Process for Fabricating Magnetic Devices, by the same inventor, filed 8-22-85 as U.S. Ser. No. 769,619, and assigned to the same assignee, abandoned.
3. Apparatus for Coil Turn Counting and Cutting by the same inventor, filed 8-22-85 as U.S. Ser. No. 769,618, and assigned to the same assignee, abandoned.
4. Apparatus for Forming Integral Tabs 8-22-85, by the same inventor, filed as U.S. Ser. No. 769,617 and assigned to the same assignee, abandoned.
5. Method For Coil Turns Counting and Cutting, by the same inventor, filed 8-22-85 as U.S. Ser. No. 769,615 and assigned to the same assignee, abandoned.
6. Method For Forming Integral Tabs, by the same inventor, filed 8-22-85 as U.S. Ser. No. 769,616 and assigned to the same assignee, abandoned.

FIELD OF THE INVENTION

The subject apparatus and process is used for making magnetic core inductors, transformers, helical coils therefor, and the like.

BACKGROUND OF THE INVENTION

Magnetic coils for inductors are currently manufactured in two ways. The first and most common method of coil manufacture is the wrapping of circular copper wire on a bobbin which is then placed on a magnetic core. The other method that is sometimes used is the wrapping of a rectangular copper strip on a bobbin as a spiral wound coil which is then placed on a magnetic core.

Coils formed by the first approach are quite readily fabricated but have numerous disadvantages which are, in part, overcome by strip wound coils. Thus, because the rectangular strip fits better or tighter on a bobbin, a larger amount of conductor may be wound on a bobbin and internal losses are reduced. Strip wound coils are easier to tap and have better thermal heat conductivity, as well, as, a lesser danger of arcing because consecutive turns lay next to each other rather than being displaced so that no large voltage exists between turns.

Both prior art wire wound and strip wound coils require bobbins which are disadvantageous both in coil winding and in coil use, and neither readily admit of any modification once a coil is completed.

The edge "winding" of a flat strip to form a helical coil is normally an expensive and time-consuming man-drill operation that militates against widespread application of such coils. (See the citations infra herein.)

The present invention, in extreme contrast comprises a process for forming such helical or a helix-wound coil for an inductor which has all of the advantages of a strip wound coil and additional advantages, as noted below, and further provides a simple and economical process of producing such a coil.

SUMMARY OF INVENTION

The coil for the inductor of the present invention is formed by passing a commercially available conducting strip having a wedge shaped cross section, between spaced parallel faces of a pair of conical rollers. The result is a helical coil with appropriate diameter, conductor width and conductor thickness.

Next, the coil is annealed in a controlled environment to avoid oxidation and tarnishing, and to make the metal of the coil malleable.

The annealed coils is then subjected to a tabbing step wherein the coils is gripped at a predetermined position at a number of turns or portion thereof from at least one end to permit the coil to be unrolled from the gripped positions. A roller or rod forces the unrolling of the ends, with a slot provided to receive and contain the tab being formed. The cross sectional area of the tab is diminished approximately 10% due to elongation which avoids wrinkling of the outer edge and also avoids tearing of the inner edge. The relative height of the slot forming to the coil determines the amount of offset of the tab from a tangential direction relative to the coil opening. It is this offset which permits the tab to exit cores without interference therefrom. Some conventional cores require larger offsets than other cores.

The tabbed helical coil is covered by an insulating coating, e.g. epoxy, which is removed from the terminal portions of the tabs and the coil is then cured or baked.

The next step is heavy compression of the coil along its axis, followed by coil shipment or assembly of the tabbed coil in the magnetic core. Optionally, testing, inspecting and numbering steps may be performed on the coil, in lieu of assembly, for shipment, per se. Or such steps may be performed prior to assembly, followed by packaging and shipment.

DESCRIPTION OF THE FIGURES

FIG. 1 is a top plan view of a coil made by the instant apparatus process;

FIG. 2 is a view in section of the coil strip or ribbon conductor;

FIG. 3 is a view in side elevation of the coil;

FIG. 4 is an exploded view of a core and coil assembly;

FIG. 5 shows the compressed coil assembled in the core.

FIG. 14 is a top plan view of guiding structure for the strip arriving at the forming cones and exiting the cones;

FIG. 14A is a view in side elevation of helical forming structure;

FIG. 15 is a view of the guiding structure of FIG. 14 in side elevation;

FIG. 30 is a view in side elevation of a tabbing structure;

FIGS. 31A, 31B, and 31C are outlined detailed views of the structure of FIG. 30; using three different step frame members.

FIG. 32 is an enlarged view of the trolley portion of FIG. 30.

FIG. 33 is a sectional view of FIG. 32;

FIG. 35 shows a detailed view of a turn end guide for either tabber embodiment;

FIG. 36 shows a conventional numbering station;

FIG. 37 is a schematic representation of a coating station;

FIG. 38 is a conventional bake oven;

FIG. 39 shows a punch press utilized to compress the coils;

DETAILED DESCRIPTION OF A PREFERRED EMBODIMENT

Figure 6:
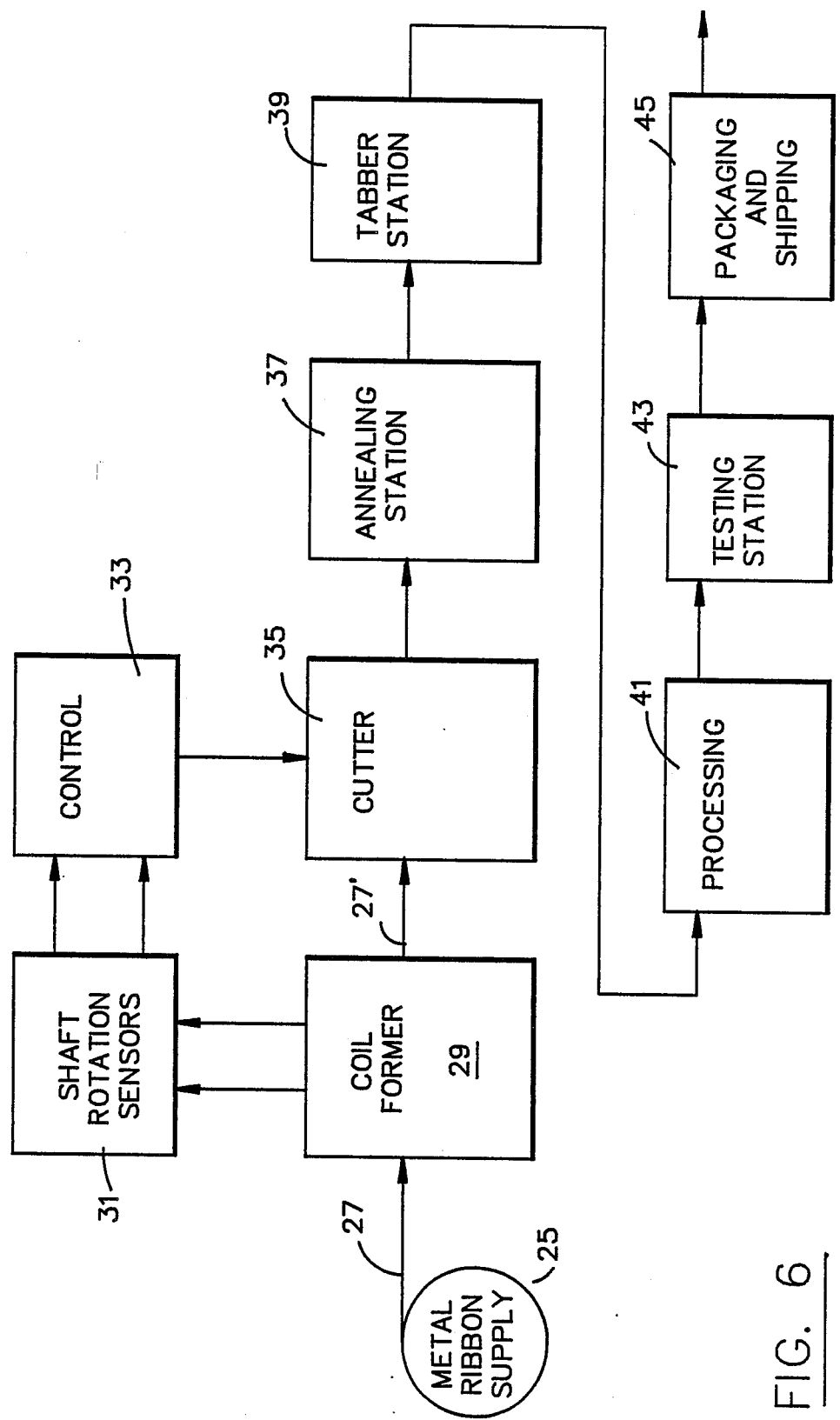
FIG. 6 is a block diagram of suitable apparatus for carrying out the process of the present invention.

The basic type COIL 11 (FIG. 1) to be formed by the apparatus or method of the present invention comprises a novel magnetic coil helix winding CONDUCTOR 12, in helical shape, adapted to be placed upon a conventional magnetic CORE 24 (FIG. 5) for improved performance characteristics. The COIL 11 is formed of a material having good electrical conductivity, such as copper, with the CONDUCTOR 12 having a rectangular cross section, including insulative COATING 13 (FIG. 2), and elongated integral TABS 15 and 16. The CONDUCTOR 12 is preformed into a helical coil configuration which may be circular, square, or rectangular, depending upon the shape of the core upon which it is adapted to fit.

By pre-forming the coil WINDING 11, it is possible t shape and complete the COIL 11 separately from any support or mandrill structure, so that the coil's physical characteristics are exactly predeterminable, and, also, windings may be readily interchanged on a core. No bobbin or the like is required with the present invention so that the entire winding volume may be employed for conductor instead of some space being taken up by a bobbin. Windings produced by the present invention are designed for optimum operation for the intended application.

The integral TABS 15 and 16 may comprise partial or full unwound elongated turns of the COIL 11 with the cross section thereof being less than the cross section of an unwound coil turn, which construction admits of continuous production rather than single coil production, as well as automatic processing steps due to stacking and dispensing.

The integral TABS 15 and 16 are indented at 19 and 20 and inwardly offset relative to the COIL 11 to accommodate core WINDOW EDGES 17 (FIG. 4), thereby enhancing winding efficiency on the core while enabling parallel tab leads from the same side of the coil to fit printed circuit board receiving slots (not shown), avoid snorting and providing aesthetic appeal. The tabs also allow bolting for a hard connection to the frame or heat sink.

The metal of the coil turns (e.g. copper) is annealed during processing to establish malleability thereof which, among other features, permits the turn to be unwound for a tab, the helix to be elongated for ease of insulative coating and to receive a toroidal core, if desired.

Thus, the present invention produces a helical or helix-wound coil inductor which has all of the advantages of a strip wound coil, and additionally advantages, as noted below.

1. Integral tabbing reguires no connection to the coil; soldering, welding or other joints. Another advantage is that being of the same material, compatability is of no concern.

2. The coil and integral tabs have configurations to accommodate window edges, while maximizing coil metal on the core, and providing parallel tabs extending from the same side of the coil for printed circuit plug-in or other types of connections or mountings.

3. The so-configured coil and tabs are capable of efficiently fitting conventional magnetic cores to enhance performance and facilitate automatic production techniques.

4. Partial or full turns may be unwound to comprise the tabs in positions to flexibly accommodate various exit window configurations.

5. The coil is characterized by malleability to permit complete coating of the turns, facilitates gripping for the tabbing operation and enable compression.

6. A device of improved performance characteristics which is easier to fabricate, delivers a connection tab of any desired length, and conserves space.

7. The malleable elongated tabs permit termination of the coil in various connector configurations.

CONDUCTOR 12 has a rectangular cross section (FIG. 2) and is coated, or otherwise enclosed, by the INSULATING ENVELOPE 13. The CONDUCTOR 12 of the winding is formed of a metal having good electrical conducting properties, such as copper or aluminum, and is reformed into the circular helical configuration, best seen in FIG. 3.

FIG. 1 also shows the integral tabs 15 and 16 having cross sectional WIDTHS T2, less than the cross sectional WIDTH T1, of any turn. The apparent indentations or generally inwardly extending arcuate REGIONS 19, 20 account for the offsets of the tabs from tangents to the CENTRAL OPENING 18, such that the ARCUATE REGIONS 19, 20 may accommodate the vertical edges of conventional core outer leg arcuate portions. This permits a snug fit between the coil periphery and the outer leg portions ensuring maximum efficiency of window metal.

FIG. 4 shows the COIL or WINDING 11, after it is compressed in the process of the present invention, ready to receive upper and lower CORE HALVES 24A and 24B, and FIG. 5 shows a completed inductor ready for shipment. However, frequently the end product of the process is the coil or winding 11, only. Other products include multiple coils on a single core, one or more coils or windings on a single toroidal core, transformers, and the like.

FIG. 6 shows blocks depicting various stations useful in the coil or inductor making process of this ivention. A supply of metal ribbon may be purchased on large spools, such as shown at 25, for initiating the forming process. Some manufacturers of copper strip material will supply it with trapezoidal cross section which is preferred for this processing.

By way of example, copper strips of widths from $\frac{1}{8}$ inches to $\frac{7}{8}$ inches have been used to make coils of 0.4 inches outside diameter to 3.5 inches outside diameter. The thickness of these strips is discussed in connection with the discussion of FIG. 13.

The invention apparatus or method described herein is believed to be capable of conveniently producing coils having outside diameters in the range of from 0.4 inches to 5.0 inches, the coils having corresponding widths in the range of from 0.1 inches to 1.25 inches.

Figure 13:
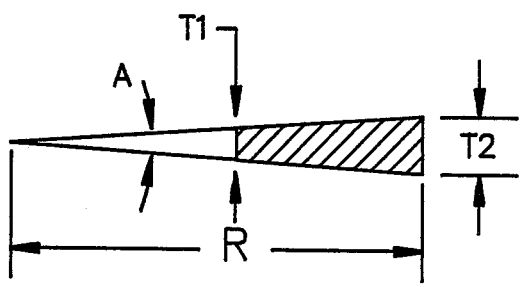
FIG. 13 illustrates the relationship between R and the width and angle of the wedge shaped strip.

The relationship between the desired thickness of the material at the outside perimeter and that at the inside perimeter and the edge thicknesses of the feed strip stock material is discussed later in connection with the discussion of FIG. 13.

The SUPPLY 25 makes STRIP MATERIAL 27 available to COIL FORMER 29 which forms it into an open or non-compressed helical shape in a continuous manner. The SHAFT ROTATION SENSOR 31, and CONTROL BLOCK 33 measure the number of turns in a helix and actuate CUTTER ASSEMBLY 35 after a set predetermined number of turns from the open helical coil; to sever the coil from the STRIP 27'.

Next, the coils are delivered to ANNEALING STATION 37 where they are heat treated in a controlled atmosphere of carbon dioxide, helium, inert atmosphere, or the like, to render them malleable.

TABBER STATION 39 is provided for unrolling and reshaping a part of a turn or turns for providing spaced apart connection to the coil.

PROCESSING BLOCK 41 may include more conventional type steps, such as cleaning, identification, as by numbering or decal, insulative coating, baking, or compressing. A cleaning step may also be used between SUPPLY 25 and COIL FORMER 29, unless the supply strip is already quite clean.

In the event assembly is required, it may be included in the PROCESSING BLOCK 41. Testing is performed at STATION 43 after assembly and potting. After testing, the good product is ready for packaging and shipping at STATION 45.

The invention will now be described, in detail along with suitable apparatus for carrying out each manufacturing step.

Figure 7:
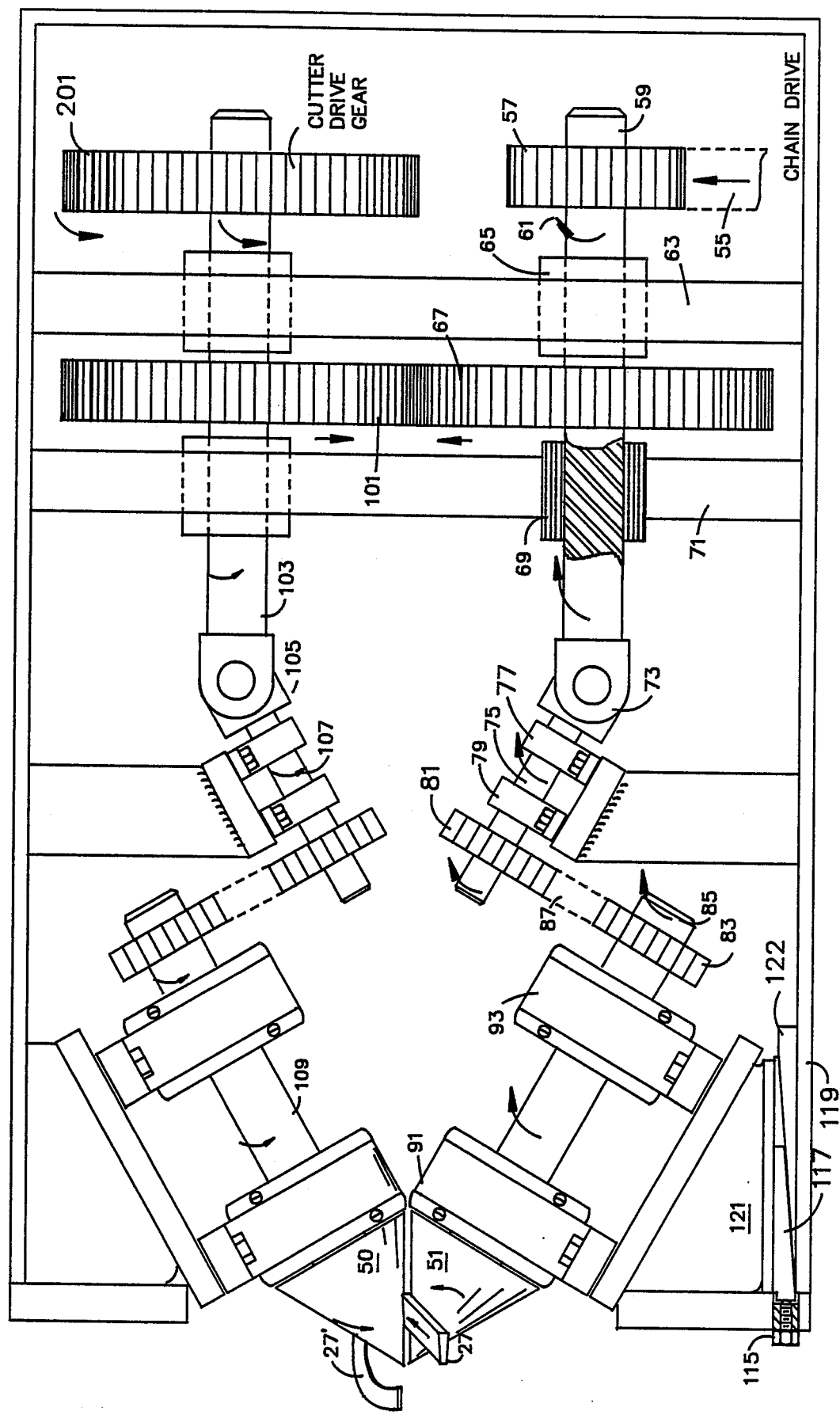
FIG. 7 is a view, in side elevation of a driving arrangement for the coil forming cones.

Thus, in FIG. 7, a suitable coil former apparatus is depicted in side elevation, and it may weigh several hundred pounds to supply sufficient drive (and absorb any impact) to the COIL FORMING CONES 50 and 51, shown forming the rectangular shaped left or forward END 27 into trapezoidal shaped STRIP 27' which follow into an upward reaching spiral configured path due to the RAMP or DEFLECTOR 184 (FIGS. 14A and 15).

A one and a half or two horsepower electric motor (not shown) is sufficient to power chain drive 55, which engages 57, fixed to shaft 59, to turn this shaft in a clockwise direction, viewed from the right (as indicated by arrow 61), thereby moving CONE 51 clockwise and drawing the STRIP 27 through the cones.

To effect this drive, SHAFT 59 penetrates FRAME WALL 63 via BEARING 65, and carries POWER TRANSFER GEAR 67 mounted thereon between BEARING 65 and BEARING 69 which is carried in FRAME WALL 71.

UNIVERSAL 73 supplies driving power from SHAFT 59 to SHAFT 75, journalled in PILLOW BOXES 77, 79 at an angle to shaft 59. SPROCKET 81, fixed to SHAFT 75, drives SPROCKET 83, fixed to offset but parallel SHAFT 85, by way of endless CHAIN 87. PILLOW BLOCKS 91, 93 carry SHAFT 85 which is an integral part of CONE 51.

The drive for CONE 50 is identical, with GEAR 101, driven from GEAR 67, supplying power to SHAFT 103, UNIVERSAL 105, SHAFT 107 and SHAFT 109 having cone 50 as an integral part.

It may be seen that the forming surfaces of CONES 50, 51 are parallel and spaced apart sufficiently as to form the straight TRAPEZOIDAL STRIP 27 into a circular rectangular STRIP 27' while a GUIDING RAMP 184 (FIGS. 14, 15) on the exit side spirals the coils over the top of CONE 50 to form the helical coils herein processed. Such cone spacing is variable (e.g.) from abut 0.010 inches to 0.100 inches.

The matcing CONES 50, 51 measure approximately 2.5 inches at the base diameter, and have a height of 2.5 inches.

The arrangement of FIG. 7 includes an inclined plane adjustment for controlling the exact spacing between the cones. SCREW 115 (lower left) forces INCLINED PLANE 117 forward and thereby up inclined plane 120 between FRAME MEMBER 119 and WEB 121 to move CONE 51 closer to CONE 50 resulting in a thinner turns in the coil.

Thus, the driving arrangement of FIG. 7 permits parallel driving, as well as angular driving, to achieve parallel conical forming surfaces. The driving speed is variable from (e.g.) 4 turns per second to one turn per two seconds. In all cases, two cone shaft rotations are required for each coil turn made by the machine for 60 degree cones.

Figure 8:
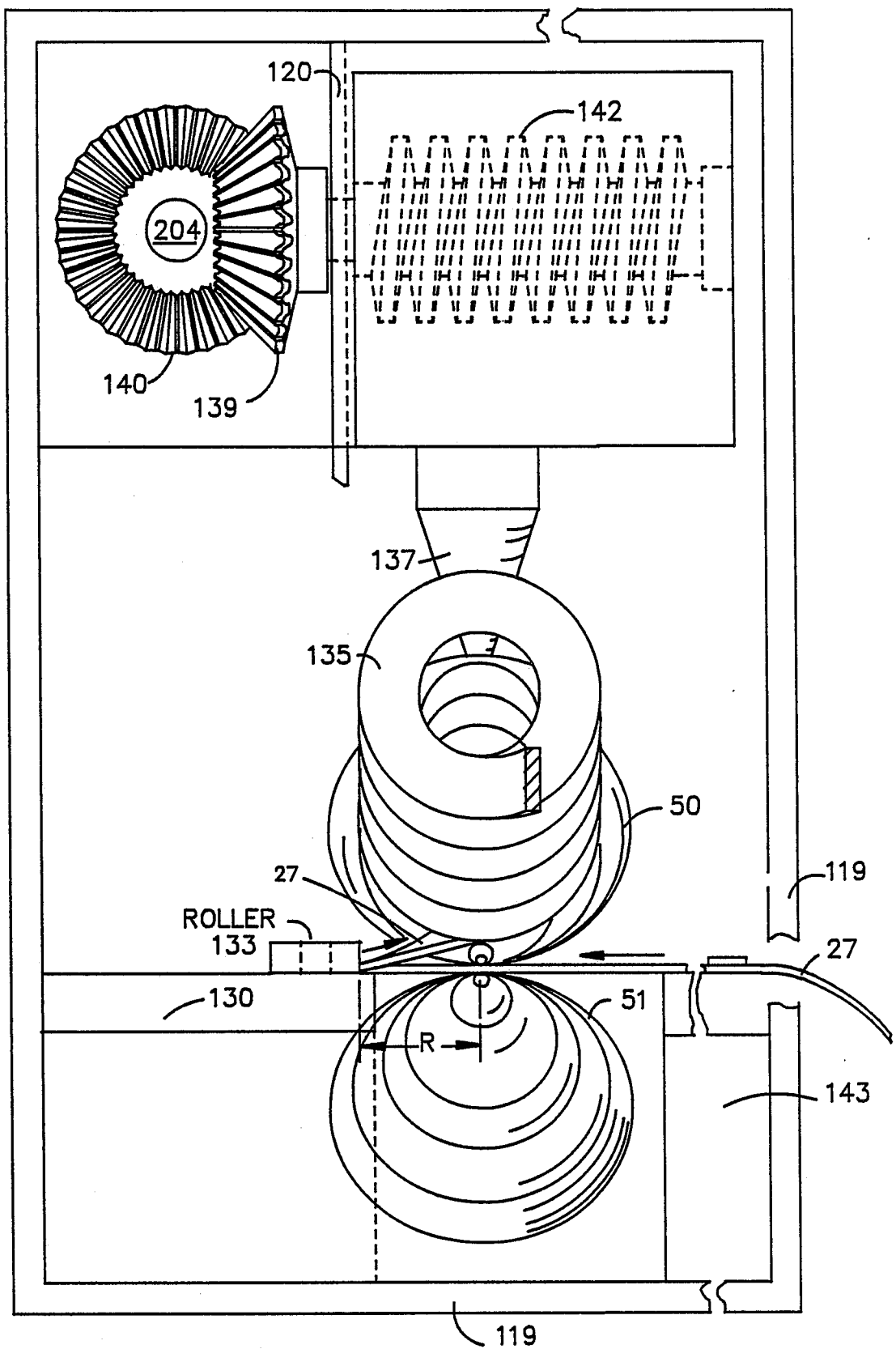
FIG. 8 is a view in front elevation to show the cooperation between the coil forming cones and the cutter cones.

FIG. 8 is a view of the forming CONES 50, 51 in front elevation, better to show the pathway followed by the spiralling STRIP 27'. FRAME MEMBER 130 supports ROLLER 133 which is positioned to bear against strip 27' after it has passed through CONES 50, 51, to maintaining a circular fixed radius (R) directing it to GUIDING RAMP 184 guides or deflects it upwardly along a spiralling path which automatically forms the helical coil as further STRIP 27 is drawn inbetween the cones.

FIG. 8 shows a large number of turns terminating in TIRN 135. At least, selectively five turns have passed through the cutter CONES (e.g.) 137, preparatory to severing. The cutter cone driving gears, including bevel gears 140, 139, visible in the upper left quadrant of FIG. 8, as well as ring gears 137F and 137'B FIGS. 9 and 16, serve to orient these Figures. These latter figures better show the relation between WORM GEAR 142 and BEVEL GEAR 139.2.

Figure 9:
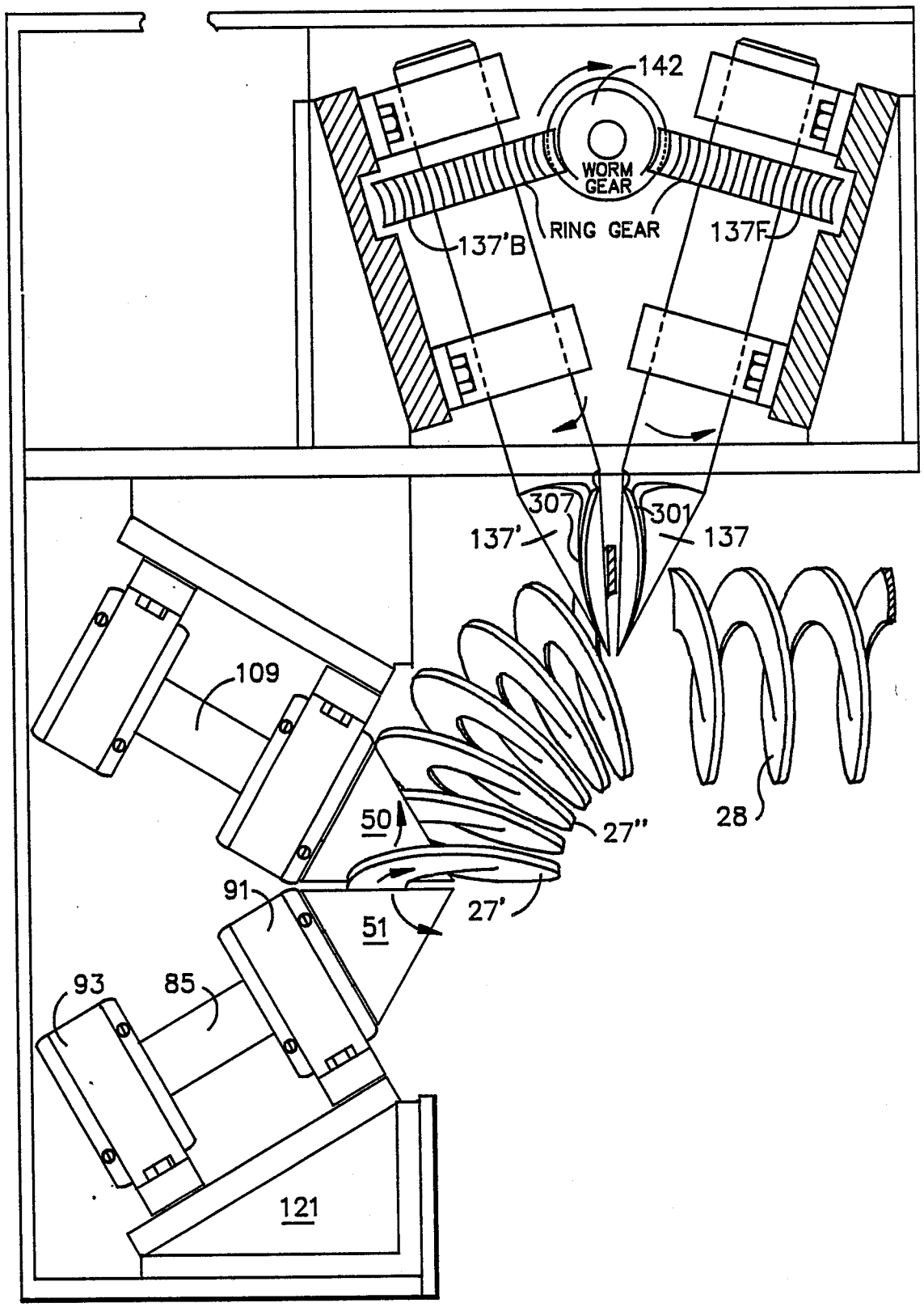
FIG. 9 is a view in side elevation showing the coil being formed in the forming cones and the severed in the cutting cones.

In FIG. 9, the emerging STRIP 27' is seen exiting CONES 50 and 51 (ROLLER 133 and RAMP 184 ARE not shown in this Figure for purposes of clarity). Six turns of the helix 27" are seen between the forming CONES 50, 51 and cutter CONES 137', 137. An uncompleted COIL 28 having, approximately three visible turns, has been separated from the STRIP 27' by the CUTTER CONES 137', 137 for transfer to ANNEALING STATION 37 (FIG. 6).

The sprialling action of strip 27', occasioned by forming CONES 50, 51 and GUIDING RAMP 184 directs the coil 27" to cutters 137', 137.

Before proceeding further with the cutter drive of FIG. 16, the dimensioning of trapezoidal STRIP 27, relative to coil diameter and cone ROTATION will be described, followed by a description of the adjustable input structure to CONES 50, 51.

FIGS. 10-13 illustrate know-how techniques with respect to the trapezoidal shape of the STRIP 27 and the RADIUS (R) of curvature of the helical coil (external diameter) for processing the basic product herein.

Figure 11:
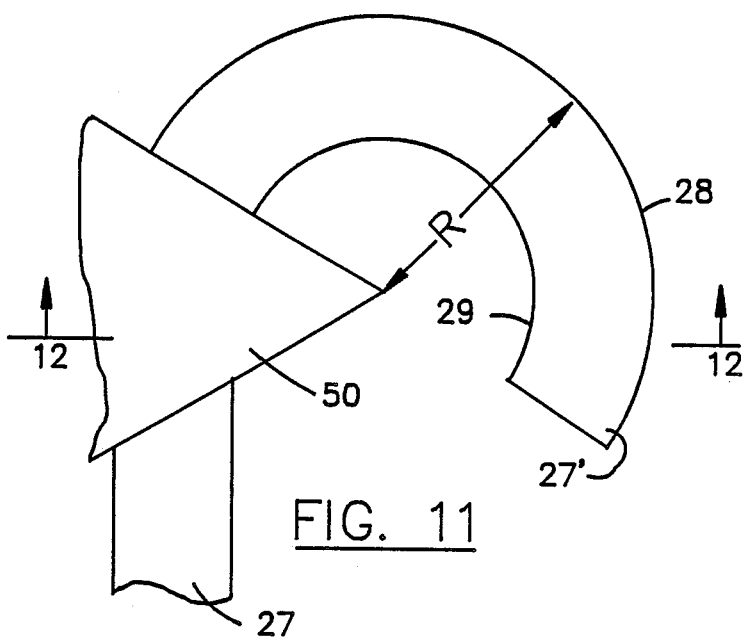
FIG. 11 shows the strip being helically formed by the cones.

The helical coils, in accordance herewith, are formed by passing the STRIP 37 strip (FIGS. 12 and 13) of conducting material through the CONICAL ROLLERS 50, 51 which operate, per se, to pull the strip into a circular path (FIG. 11). The larger radius EDGE 28 of the exterior of the CIRCULAR PATH or STRIP 27' requires more material than the inner RADIUS or EDGE 29 and, consequently, the present invention provides for additional material, through elongating and shaping as required. To this end, a trapezoidal or wedge-shaped STRIP 27 (FIG. 12) is used for insertion between the ROLLERS 50, 51.

Figure 10:
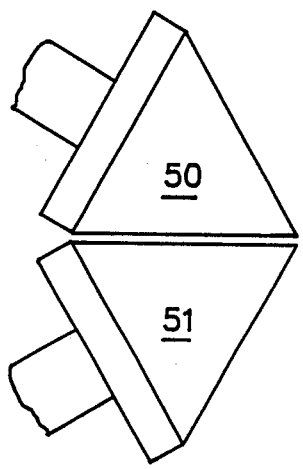
FIG. 10 shows the matched, spaced apart coil forming cones.

The wedge shaped STRIP 27 is then fed between the pair of rotating CONICAL ROLLERS 50 and 51. The circumferential surfaces of these ROLLERS 50 and 51, as they come together, are parallel and are oriented to dispose the facing surfaces of the cones in spaced parallel relation, as indicated in the detail of FIG. 10. The wedge shaped STRIP 27 is fed between these rollers which then deforms the strip into a RECTANGULAR CROSS SECTION as indicated at 12 in FIG. 2, and causes the strip to travel in a circular path, as indicated in FIG. 11.

It is noted that there are certain limitations upon the shape or dimensions of the wedge shaped STRIP 27, and also the placement of the strip in passage through the CONICAL ROLLERS 50, 51.

Figure 12:
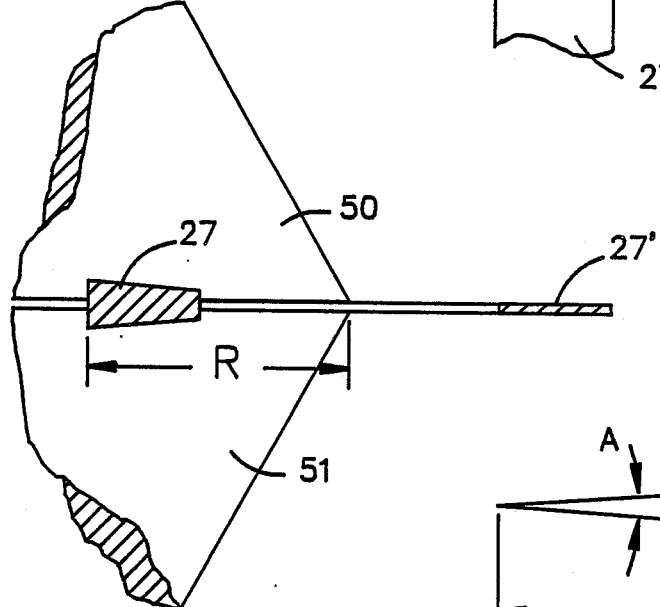
FIG. 12 shows the wedge shaped input strip being rolled into a rectangular shape by the forming cones and the point of insertion relative to the tip of the cones to establish R.

In FIG. 12 there is illustrated an enlarged cross-sectional representation of the wedge shaped STRIP 27. The DISTANCE R from the thick side T2 of the WEDGE 27 to the point where the extension of the wedge sides converge (FIG. 13) must be the same as the RADIUS R of the desired helix outside diameter, as indicated in FIG. 11. It is also necessary for the STRIP 27 to be inserted between the CONICAL ROLLERS 50 and 51 with the thick side of the wedge at the same DISTANCE R from the tips of the conical rollers which is equal to the radius of the desired helix to be formed by the process hereof. It will thus be seen that the tips or points of the conical rollers are disposed at the center of the helix formed by the present process. The taper of the wedge or TRAPEZOID 27 is selected for meeting the specifications of the product ordered. It is noted that the thickness of the turns of the final coil can be no greater than the THICKNESS T1 of the small side of the TRAPEZOID 27.

It will be seen that the process or apparatus of the present invention is capable of rapidly and inexpensively producing helical coils in accordance with those described herein. If it is desired to produce rectangular coils it is only necessary to remove or shear off unneeded sections of an oversized round coil.

Next, the purpose of the structure of FIGS. 14 and 15 is to show the input adjustable guiding structure for the STRIP 27 from the SUPPLY 25 through the forming CONES 50, 51.

GUIDING BLOCK 141 is rigidly carried by BASE 143 (FIGS. 8 and 14), and includes the strip GUIDING ROLLERS 147, 149 and 151 with OVERHANG 153, carried by ROLLER 149 MOUNTING BOLT 155 serving to maintain STRIP 27 along the pathway and against BASE 143. SLIDEABLE BLOCK 161 moves ROLLERS 163, 165 against STRIP 27 through adjustment BOLTS 171, 172 in SLOTS 173, 174. Adjustment SCREW 175 is provided to move slidable BLOCK 161 and assist in locking same.

In FIG. 14, ROLLER 133 is shown in contact with STRIP 27', to maintain the strip in the helical configuration and to eliminate small variations in the coil diameter. ROLLER 133 is carried by ADJUSTABLE BLOCK 181 through SCREWS 183, 185 and SLOTS 187, 189 and is adjustable through adjustable SCREW 190 (FIG. 15).

Figure 16:
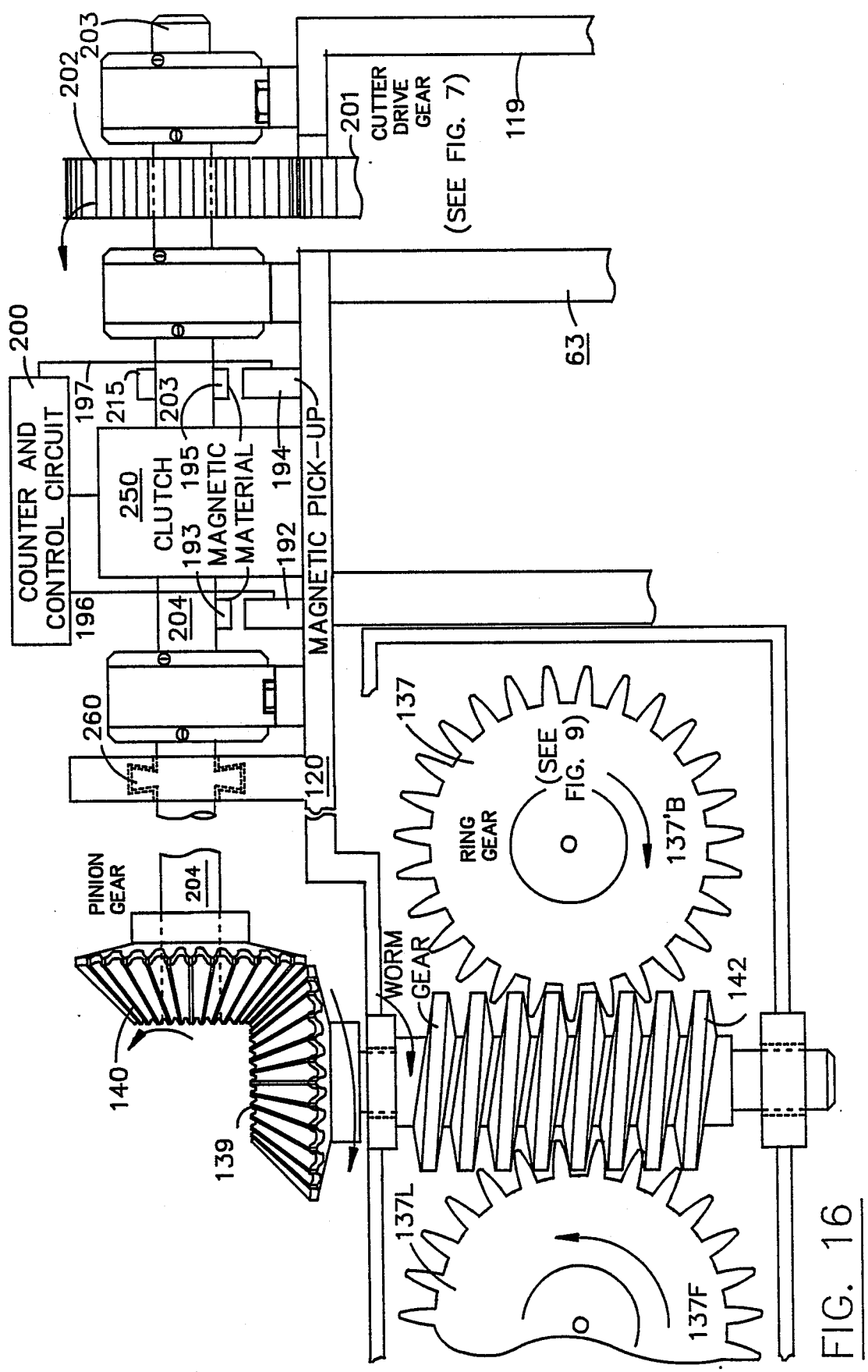
FIG. 16 shows the driving arrangement for the cutter cones then along 18—18 of FIG. 17.

Returning now to the CUTTER DRIVE, in FIG. 16 there is seen the drive and clutch assembly for the CUTTER CONES 137' 137 of FIG. 9. FIGS. 7, 8 and 9 cooperate with the structure of FIG. 16 to effect this drive. In FIG. 7, there is seen the input CUTTER DRIVING GEAR 201 which mates with GEAR 202 in FIG. 16 to supply driving power.

Figure 21:
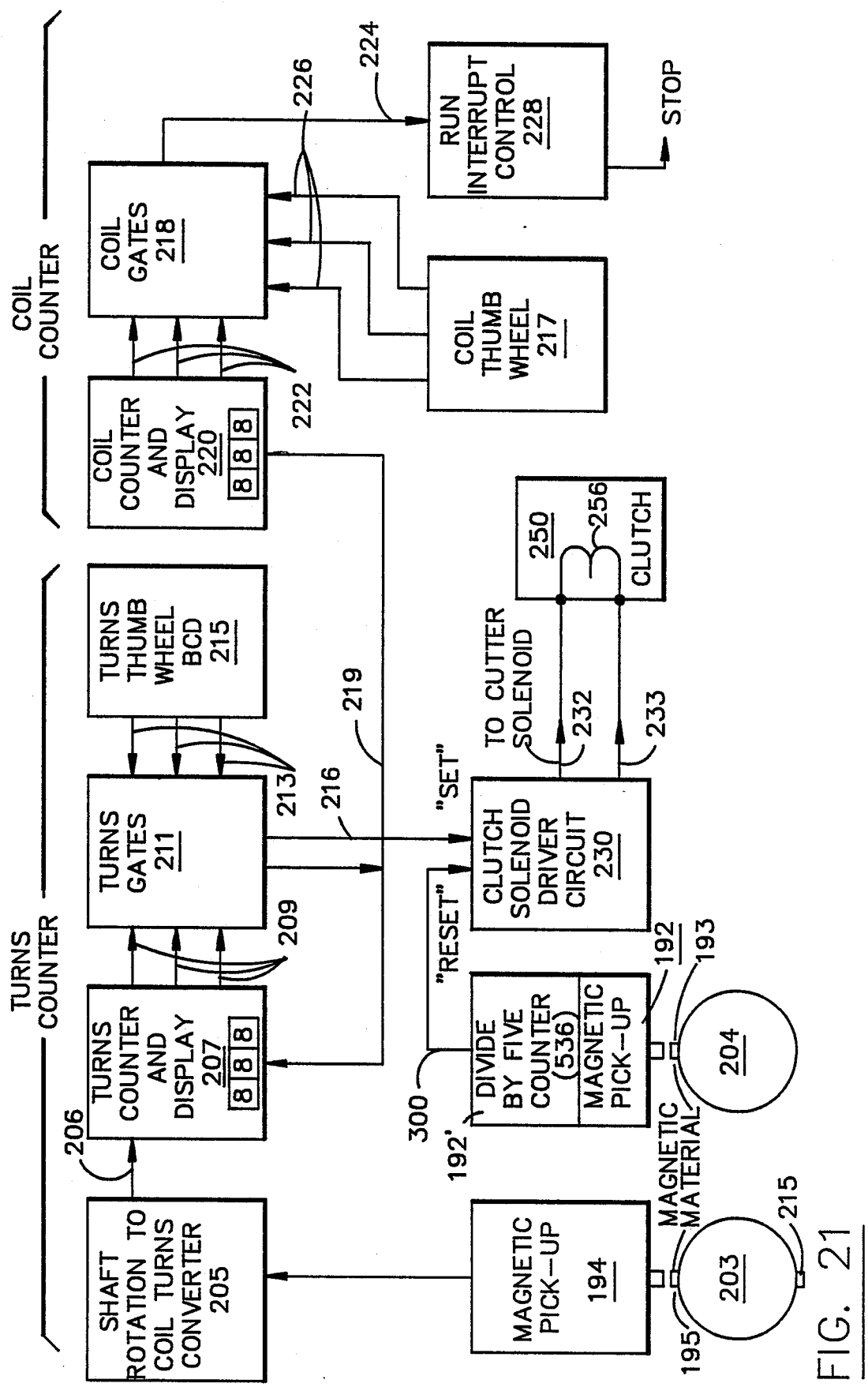
FIG. 21 is a block diagram of an electrical circuit to operate the clutch and consequently the cutter.
Figure 21A:
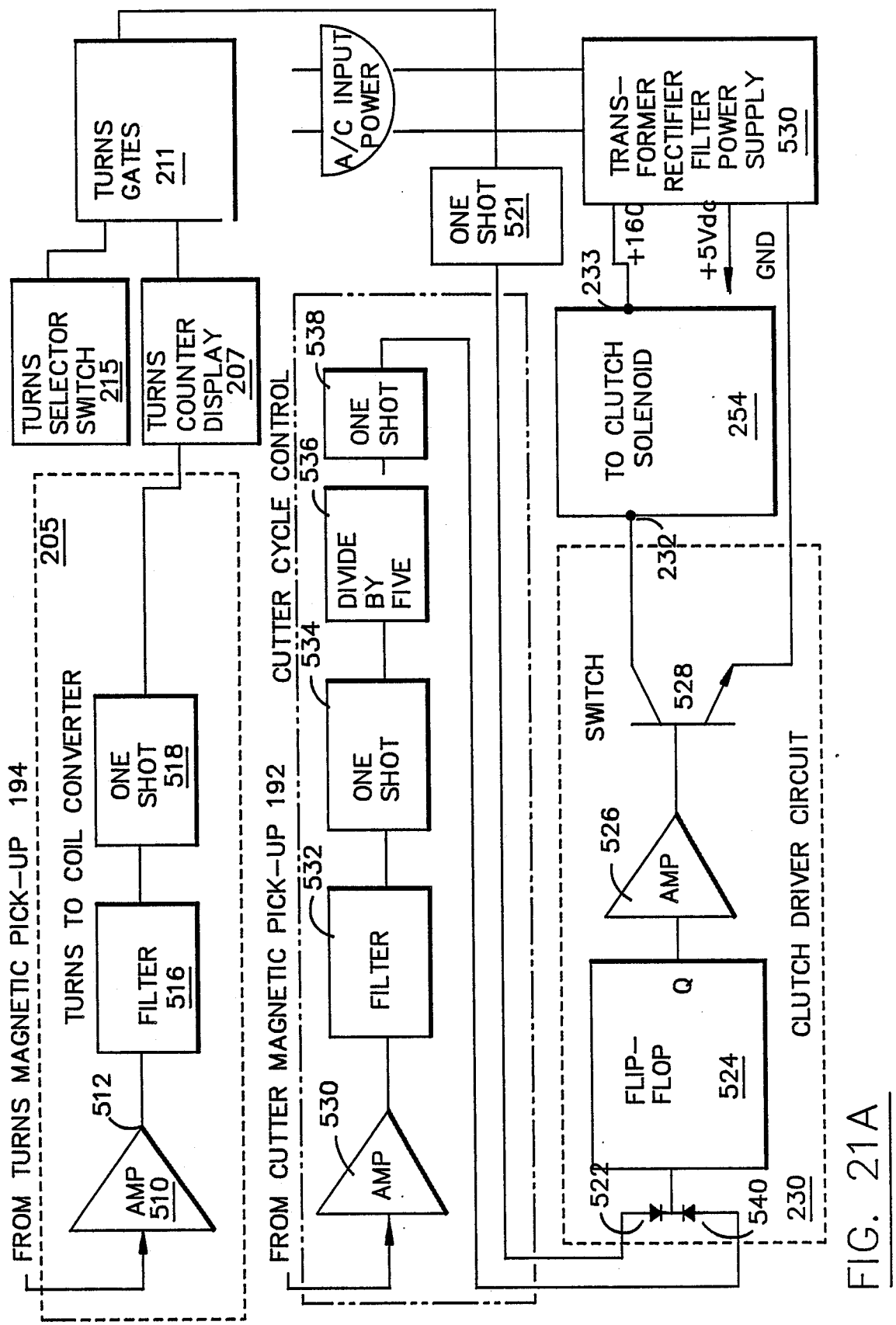
FIG. 21A is a more detailed circuit diagram of the block circuit of FIG. 21.

The cutters drive in forward and reverse, the clutch engagement and disengagement and the electrical controls are next discussed with cross reference to the structure of FIGS. 21 and 21A.

For sensor orientation, refer to FIG. 6, BLOCK 31 which is titled "SHAFT ROTATION SENSORS". This block is intended to represent sensors, such as the MAGNETIC PICK-UP sensors 192, and 194, which cooperate with MAGNETIC MATERIAL 193, 195 and 215 in FIG. 16. These sensors are conventional magnetic pick-ups. The MAGNETIC MATERIAL 193, 195, and 215 may comprise a bolt head, or the like.

The application of these sensors is accomplished by fastening a MAGNETIC PICK-UP ASSEMBLY 192, 194 to the left frame wall 120 (as seen from the front view of FIG. 8) of frame 119. Fastening is typically achieved by drilling and tapping receiving holes for threaded MAGNETIC PICK-UPS 192 and 194. The threaded holes in the wall are not shown in FIG. 16.

The OUTPUT LEADS 196, 197 of the MAGNETIC PICK-UPS are coupled to the COUNTER AND CONTROL CIRCUIT, represented by BLOCK 200 in FIG. 16.

A block diagram of a circuit to implement the function of COUNTER AND CONTROL CIRCUIT 200 of FIG. 16 is shown in FIG. 21. BLOCK 191 in FIG. 21 represents the combined functions of SENSORS and their associated MAGNETIC MATERIALS 192, 193, 194, 195 and 215 in FIG. 16.

FIG. 21 is a block diagram of a counter circuit for counting turns of a helical coil which are fed through the open conical cutters, depicted in FIG. 9 as 137 and 137' and for counting the number of coils cut from the start of a job run. The blocks shown on the left of FIG. 21 under the bracket titled TURNS COUNTER 207 perform the function of counting coil turns to a pre-set number. The blocks on the right under the bracket titled COIL COUNTER 220 perform the function of counting the number of coils cut from the start of the job run and it provides an interrupt signal to stop the machine, at the conclusion of the run (predetermined number of coils desired).

Referring now to the left side of FIG. 21, and to FIG. 16, BLOCK 205 represents a SHAFT ROTATION TO COIL TURNS CONVERTER conversion function augmented via counter circuiry to respond to signals from MAGNETIC PICK-UP, represented by block 194. MAGNETIC PICK-UP BLOCK 194 is shown in FIG. 16, and is positioned to provide a signal consisting of two pulses for each time CLUTCH DRIVE GEAR 201 rotates the CLUTCH SHAFT DRIVE GEAR 202, thereby rotating the CLUTCH DRIVE SHAFT 203 thru two revolutios. MAGNETIC MATERIAL 195, and 215 are each bonded to SHAFT 203 to each provide a signal to PICK-UP 194 as each MAGNETIC MATERIAL passes the position of the PICK-UP 194.

Referring to FIG. 21, SHAFT ROTATION TO COIL TURNS CONVERTER BLOCK 205 divides the number of pulses received from the PICK-UP 191 (FIG. 21) by a predetermined constant to provide a signal representing the number of turns in the coil being formed by the CONES 50, 51. The signals appear on signal line 206 (to the nearest tenth of a turn).

The constant is predetermined by the gear ratios of the forming machine, e.g. two revolutions of CONES 50, 51 to one TURN 135 (FIG. 8) to five revolutions of SHAFT 204 to one CUTTER CONE 137, 137' revolution. Thus, two MAGNETIC MATERIALS 195, 215 on SHAFT 203 provides signals indicative of one tenth of a turn. The TURNS COUNTER AND DISPLAY BLOCK 207 (FIG. 21) counts the pulses representing turns. Each rotation of the cones forms one half of a helical coil turn, as is the case for 60 degree conical rollers. The TURNS COUNTER DISPLAY 207 counts and accumulates pulses from signal LINE 206 and displays the count of helical coil turns formed to the nearest tenth of a turn. The value of this count is coupled via signal bus 209 to the TURNS GATES block 211. BLOCK 211 comprises three gates for receiving, respectively, the three LEADS 209 and 213 for comparing the predetermined turns per coil number manually set count from the TURNS THUMB WHEEL BCD BLOCK 215 with the count accumulating in the TURNS COUNTER AND DISPLAY BLOCK 207. At the instant the count from block 207 on signal bus LEADS 209 matches the transmitted setting of the TURNS THUMB WHEEL BCD 215 on signal BUS LEADS 213, TURNS GATES BLOCK 211 gates send a logic pulse signal on set signal LINE 216 to the CLUTCH SOLENOID DRIVER CIRCUIT BLOCK 230.

The CLUTCH SOLENOID DRIVER CIRCUIT BLOCK 230 responds to the logic pulse to interrupt a voltage drive signal to the CLUTCH SOLENOID COIL TERMINALS 232 and 233. (The solenoid is normally on).

The right hand bracketed COIL COUNTER function of FIG. 21 provides a COIL THUMB WHEEL BCD 217 having selector switches which are manually rotated to set the number of coils to be made for the job run. Logic signal bus LEADS 226 couples logic signals representing the required number of coils to COIL GATES BLOCK 218. This block consists of three gates, the same as TURNS GATES BLOCK 211.

The TURNS GATES BLOCK 211 transmits a logic signal on signal line 219 to COIL COUNTER DISPLAY BLOCK 220, each time a signal is sent to the CLUTCH SOLENOID DRIVER CIRCUIT 230 to signal the cutting of a coil. The logic signal on signal LINE 219 is also sent to the TURNS COUNTER AND DISPLAY BLOCK 207 to reset the turns counter within TURNS COUNTER DISPLAY BLOCK 207 in preparation for counting the turns being formed for the next coil.

The logic signal on signal LINE 219 increments the counter in the COIL COUNTER DISPLAY BLOCK 220 each time a coil is cut, until the combinational gate logic circuitry within COIL GATES BLOCK 218 detects coincidence between the count in COIL COUNTER DISPLAY 220 on signal BUS LEADS 222 and the manually set value on signal BUS LEADS 226 from COIL THUMB WHEEL BCD 217. As coincidence is achieved, COIL GATES BLOCK 218 transmits an interrupt logic signal to the RUN INTERRUPT CONTROL 228, representing power control circuitry augmented to stop the machine and signal the operator that the job is complete.

The CLUTCH 250 (FIG. 16) extends drive to the cutter apparatus including SHAFT 204. FIGS. 17 through 20 show an embodiment of a clutch for coupling CLUTCH DRIVE SHAFT 203 to CUTTER DRIVE SHAFT 204 in response to interruption of the drive signal to terminals 232 and 233 (FIGS. 17 and 21) normally supplied by CLUTCH SOLENOID DRIVER CIRCUIT 230 (FIG. 21). Thus, SOLENOID 256 is normally on. The solenoid FRAME 255 is bolted via BOLTS 259, 261 to frame SIDE, 120 immediately behind solenoid FRAME 255. SOLENOID 256 is depicted in the de-energize state, ARMATURE 257 being driven to its retracted position (as shown) by SPRING 258. The travel of ARMATURE 257 is limited by thru-PIN 238 bottoming on frame FLANGE 263. The armature 257 is linked to clutch drive-pin 244 by cross member 236. Although shown as an integral assembly, it is understood that other methods of assembling the clutch DRIVE-PIN 244 to ARMATURE 257 may be used.

The clutch DRIVE-PIN 244 is formed to have a wedge or double inclined SURFACE 235, 235' for engaging and deflecting PAWL 242 at PAWL CAM SURFACE 247, 247'. Engagement is achieved as SOLENOID 256 normally energizes driving clutch drive-pin vertically into either the descending or ascending path of CAM SURFACE 247, 247' as HOUSING 250 rotates, which is the normal condition. SURFACES 247 and 247'; together with SURFACES 235, 235' enable power disengagement in either forward or reverse cutter drive.

Figure 17:
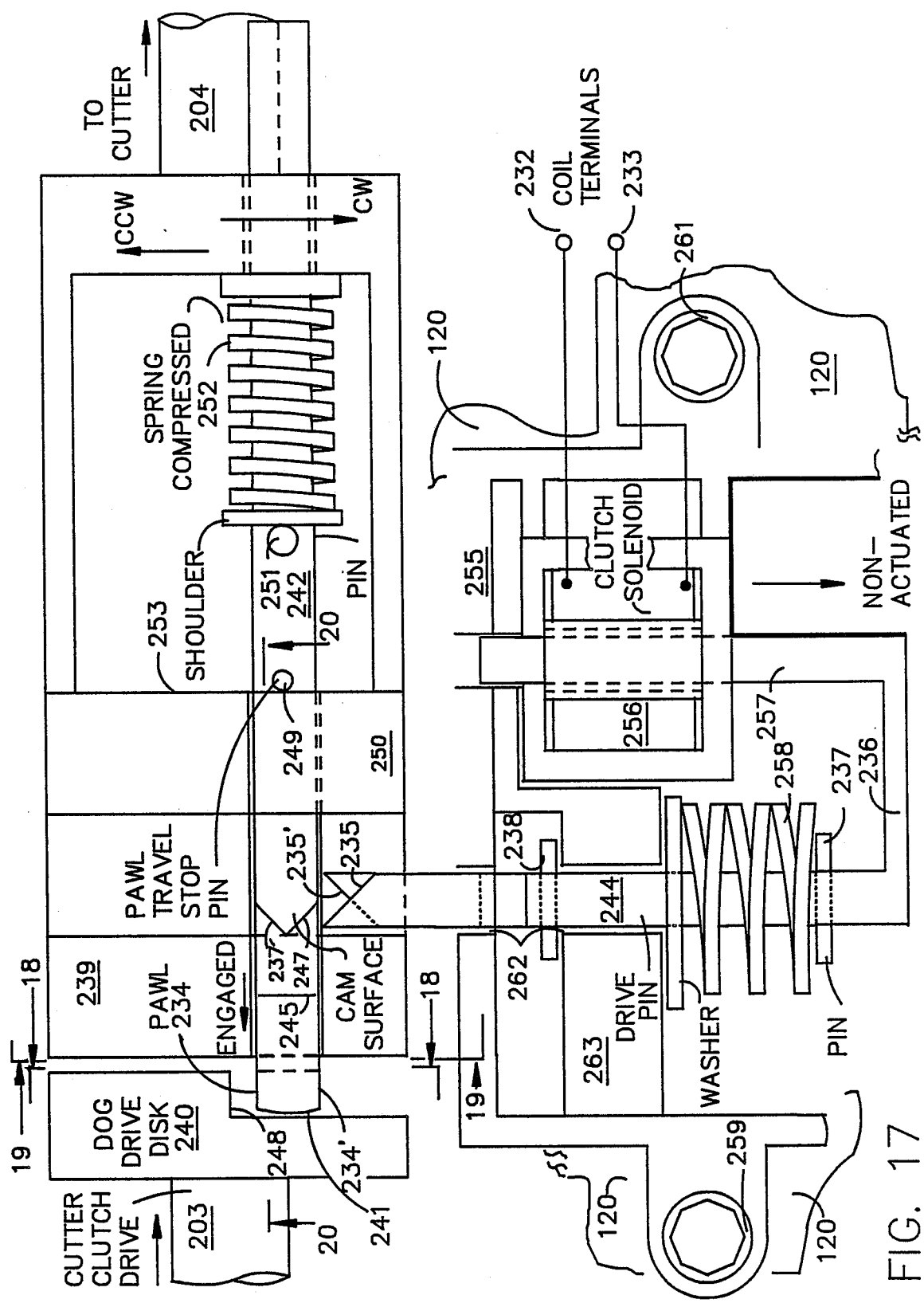
FIG. 17 is a side elevational view of the clutch assembly.
Figure 19:
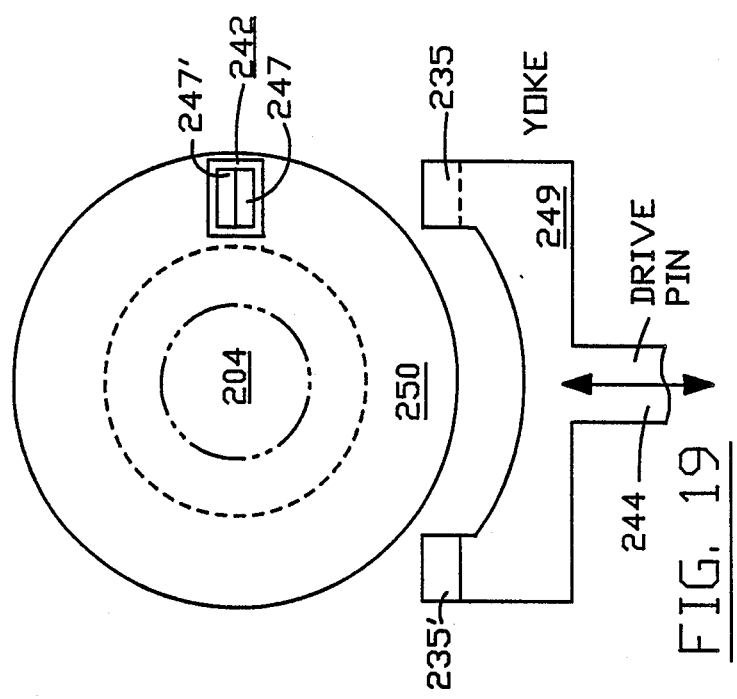
FIG. 19 is a view in end elevation of a different portion of the structure of FIG. 17 partly along the plane 19—19 of FIG. 17 and partly along the drive pin.

FIG. 19 is taken on plane 19—19 in FIG. 17. Cutter DRIVE SHAFT 204 is shown central to the face of clutch FRAME HOUSING 250'. PAWL 242 is shown at the periphery of FRAME HOUSING 250'.

Referring to FIG. 17, DOG DRIVE DISK 240 is formed to receive CLUTCH DRIVE SHAFT 203 and to mate DOG ENGAGEMENT SURFACE 248 (FIG. 17 and 18) to PAWL SURFACE 234 as CLUTCH DRIVE SHAFT 203 rotates, PAWL ENGAGEMENT SURFACE 234 receiving the dog, transmit torque to FRAME HOUSING 250' and then to CUTTER DRIVE SHAFT 204.

Figure 18:
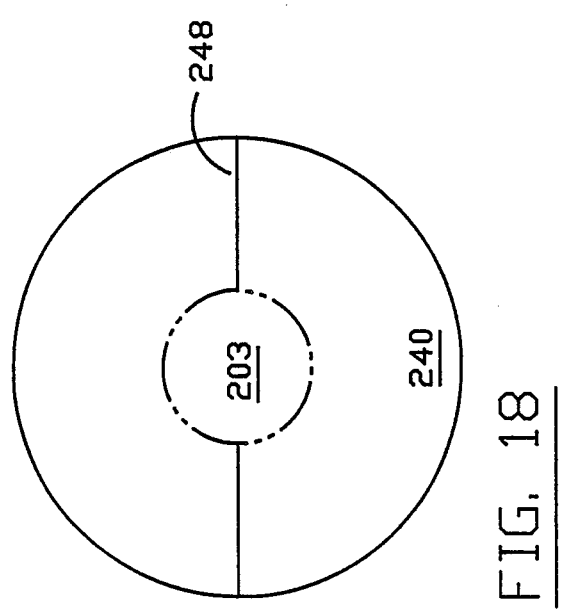
FIG. 18 is a view in end elevation of a portion of the structure of FIG. 17.

FIG. 18 is a view of the face of DOG DRIVE DISK 240, taken on plane 18—18. CLUTCH DRIVE SHAFT 203 is central with an edge of DOG SURFACE 248 shown.

FIG. 17 shows PAWL ENGAGING END 234 and SHAFT 242, extended to the left, in preparation for engagement with the DOG SURFACE 248 on DOG DRIVE DISK 240, as SHAFT 203 rotates. The leftward travel of the PAWL SHAFT 242 is restricted by pawl travel stop pin 249 against a FRAME HOUSING 250' SHOULDER 253. The pawl is propelled by SPRING 252 urging PIN 251 to the left.

As shown, SHAFT 203 will continue to rotate, the clutch will engage and drive will be transmitted to the CUTTER SHAFT 204. This sequence will be followed, and the clutch will remain engaged, driving the cutter until power is applied to SOLENOID TERMINALS 232 and 233 (FIGS. 21, 21A) to actuate SOLENOID 256, thereby disengaging the clutch.

Application of power to the solenoid terminals, drives clutch DRIVE-PIN 244 (FIG. 17) in a vertical direction, SURFACE 235 engaging SURFACE 247, or SURFACE 235', engaging surface 247', to deflect the PAWL SHAFT 242 to the right, disengaging PAUL SURFACE END 234 from DOG SURFACE 248, thereby removing drive from frame HOUSING 250'.

The CLUTCH 250 will operate as described whether rotation is clockwise or counter clockwise. In clockwise or normal operation, drive disengagement results from SURFACE 235 engaging SURFACE 247. For reverse operation, or counter clockwise operation, SURFACE 235' engages SURFACE 247', for disengagement.

Figure 20:
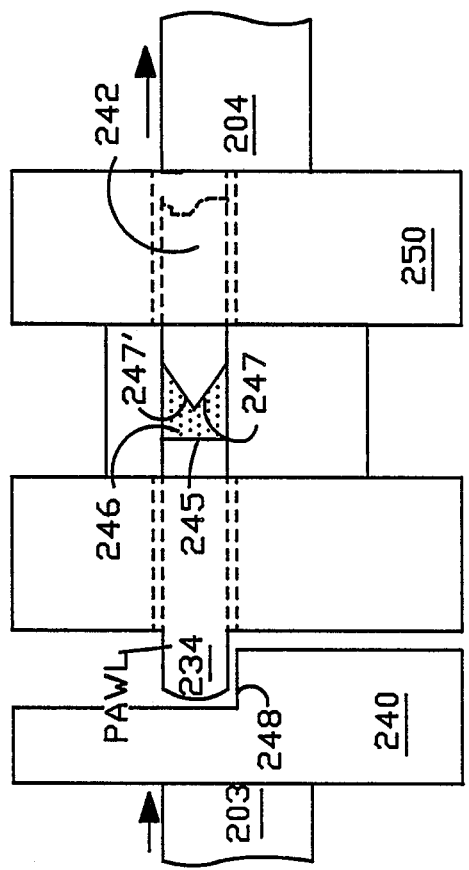
FIG. 20 is a view in side elevation to show a still different portion of the structure of FIG. 17.

FIG. 20 shows a further view of PAWL END 234 and SHAFT 242 along view plane 20—20 in FIG. 17. This view is of interest because it characterizes a NOTCH 246 in the body of PAWL 242 bounded by NOTCH SURFACE 245 and CAM SURFACES 247 AND 247'. CLUTCH DRIVE PIN 244 (FIG. 17) is radially displaced relative to WALL 120 and located to permit CLUTCH DRIVE PIN 244 to extend, engaging its WEDGE SURFACE 235 with CAM SURFACE 247 or its WEDGE SURFACE 235' with CAM SURFACE 247'.

FIG. 16 shows mechanical DRAG or FRICTION BRAKE 260 which provides a continuous braking action. The function of this brake is to (drastically and uniformly each time) limit the travel of CUTTER DRIVE SHAFT 204 when the clutch is disengaged by the application of power to the SOLENOID TERMINALS 232 and 233. It is this action which insures that the CUTTER CONES 137, 137' stop in the same position each time with the CUTTER EDGES 301 and 307 (FIG. 9) being in position to commence the next cut. Thus it should be realized that CUTTER SHAFT 204 must overcome the heavy drag of BRAKE 260 while driving and the heavy drag must overcome the momentum of the cutter upon power release, (eg) within five to seven degrees of cutter cone rotation.

To de-couple the CUTTER SHAFT 204 from driving engagement with SHAFT 203 through CLUTCH 250, the DIVIDE BY FIVE 536 (of SENSOR 192) counter 192 (FIG. 21 and 21A) counts five pulses, one each time SHAFT 201 rotates, due to MAGNETIC MATERIAL 193 being sensed by SENSOR 192, to provide a reset signal, applied over LEAD 300 (FIG. 21) to CLUTCH SOLENOID DRIVER CIRCUIT 230 to energize and maintain normally energized, SOLENOID 256 (FIG. 17).

Five turns or revolutions of SHAFT 204 correspond to revolution of CUTTERS 137, 137' (FIG. 9). Thus, the cutters are returned to proper position to commence a successive cut, when energized.

FIG. 21A is a more particular block diagram of the circuit for controlling CLUTCH SOLENOID 256. The SHAFT ROTATION TO COIL TURNS CONVERTER 205 function is implemented using an AMPLIFIER 510, for amplifying the signal from MAG TURNS PICK-UP 194. The signal is filtered by a suitable low-pass filter, comprised of resistors and capacitors to eliminate unwanted noise and transients. The signal is coupled from the AMPLIFIER OUTPUT 512, through FILTER 516 to the input of ONE-SHOT 518. The output of the ONE SHOT increments the TURNS COUNTER and DISPLAY 207 by one count as each one-tenth coil emerges from CONES 50, 51' due to the mechanical interlink with SHAFT 204. The count of TURNS COUNTER 207, to the nearest tenth of a coil turn, is compared with the operator setting of TURNS SELECTOR SWITCH 215 by TURNS GATE 211. As coincidence is achieved, BLOCK 211 fires ONE-SHOT 520 which provides a pulse via BLOCKING DIODE 522 to "set" FLIP-FLOP 524. The signal from the Q OUTPUT output of FLIP-FLOP 524 is amplified by AMP 526 to interrupt the base drive to NPN POWER TRANSISTOR 528 which operates to interrupt drive via terminal 232 to CLUTCH SOLENOID 256; thereby engaging the CUTTER CLUTCH 250.

As the CLUTCH 250 engages, drive is coupled to shaft 204 to begin operating the CUTTERS 137, 137' through a cutter machine cycle.

Each rotation of shaft 204 provides a pulse via PICK-UP 192 to AMPLIFIER 530 (FIG. 21A). The signal output of AMP 530 is filtered by FILTER 532 and applied to ONE-SHOT 534. DIVIDE BY FIVE COUNTER 536 is incremented with each pulse output of ONE-SHOT 534 and provides an output (FIG. 16). As a count of five is obtained, BLOCK 536 resets itself concurrent with its output pulse to ONE-SHOT 538.

ONE-SHOT 538 provides a pulse via BLOCKING DIODE 540 to "RESET" FLIP-FLOP 524. The signal from the Q output OF FLIP-FLOP 524 amplified via AMP 526 to provide base drive to NPN POWER TRANSISTOR 528 to switch TERMINAL 232 to GND thereby applying +160 V to CLUTCH SOLENOID 256. As the solenoid operates, CLUTCH 250 disengages drive from shaft 203 to SHAFT 204.

FIGS. 9, and 22-28 detail the novel cutter structure and philosophy engendered by the present invention for severing a continuously moving helical strip.

Figure 23:
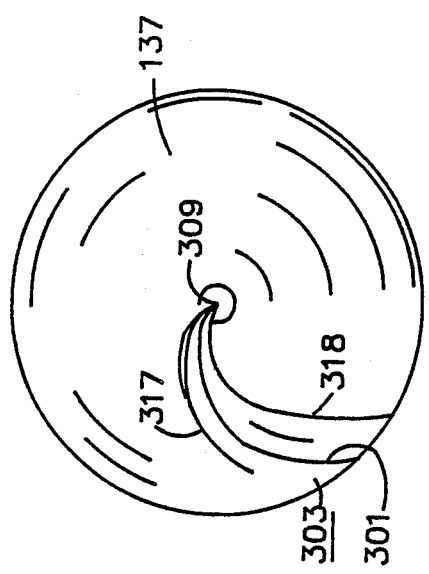
FIG. 23 is a front elevational view of a cutter cone relative to the cone layout of FIG. 22.
Figure 26:
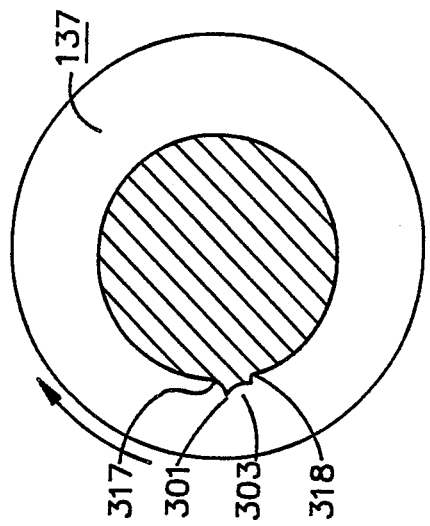
FIG. 26 is a sectional view of the cutter one of FIG. 22 taken along the plane 26—26.
Figure 22:
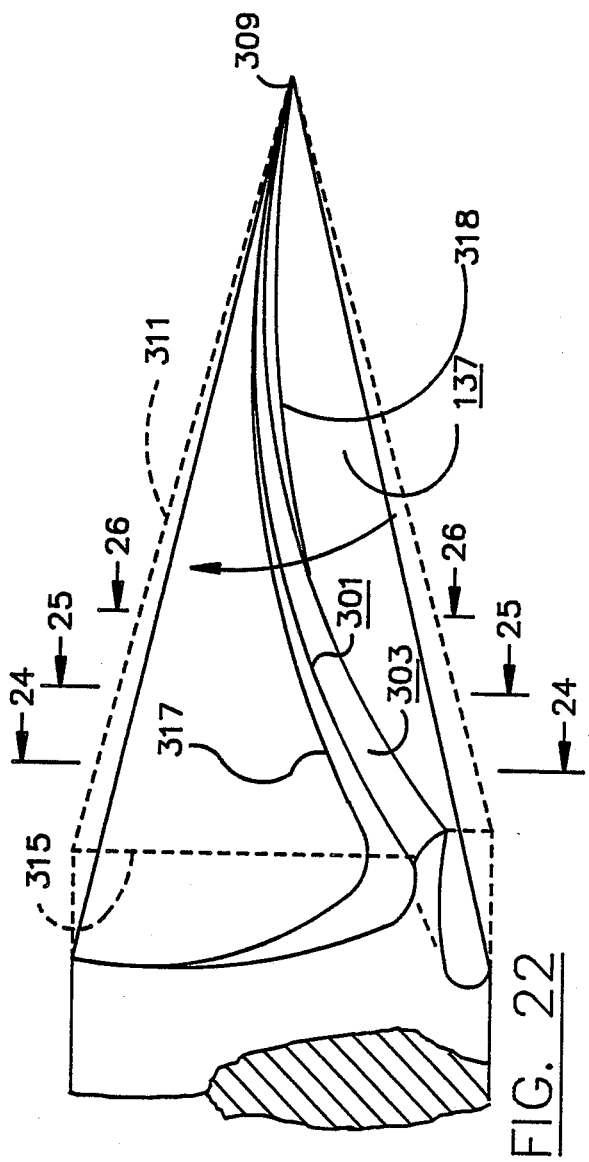
FIG. 22 is a side elevational view of a cutter cone relative to a dotted original cone layout.
Figure 25:
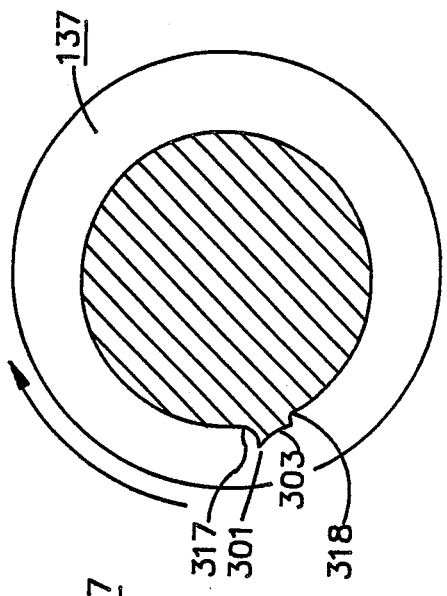
FIG. 25 is a sectional view of the cutter cone of FIG. 22 taken along the plane 25—25.
Figure 24:
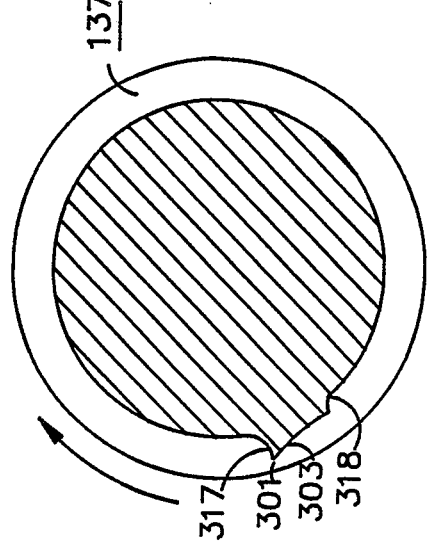
FIG. 24 is a sectional view of the cutter cone of FIG. 22 taken along the plane 24—24.

FIGS. 9 and 22, 23 best reveal the HELICAL CUTTER EDGE 301. This edge protrudes from the CONICAL CUTTER 137, and is the forward moving edge of a somewhat shaped protrusion 303. As may be seen from views FIGS. 24-26, the PROTRUSION 303 widens as the HELICAL CUTTER SURFACE 303 extends away from the CONE APEX 309.

FIG. 22 shows, in DOTTED OUTLINE 311, the original conical shape of CUTTER 137 which has been relieved, as by grinding, to leave the upstanding PROTRUSION 303. DOTED LINE 315 represents the original cylinder from which the CONICAL CUTTER 137 was formed. LINES 317 and 318 depict the conical surface of CUTTER 137 on either side of the PROTRUSION 303.

Figure 27:
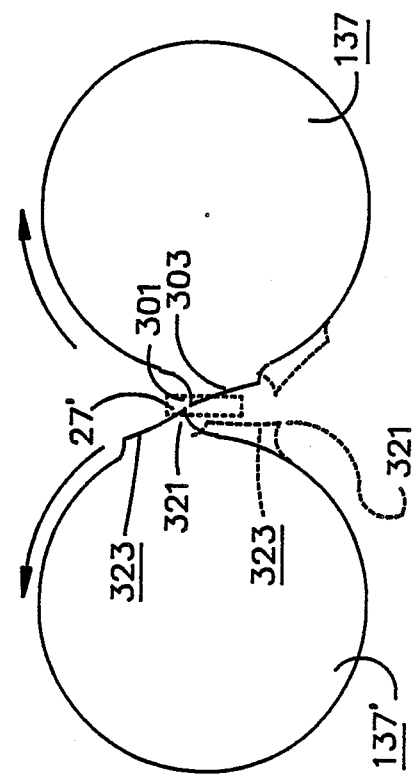
FIG. 27 is an outline drawing of the cutter cones with cutter edges in successive positions, as viewed along a portion of the plane 24—24 of FIG. 22.
Figure 28:
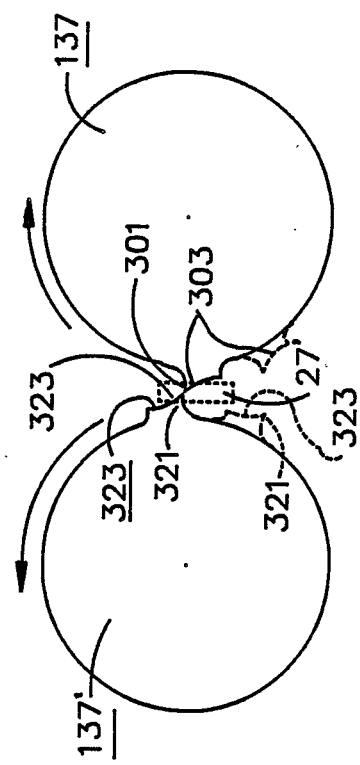
FIG. 28 is also an outline drawing of the cutter cones with cutter edges in successive position, as viewed along a portion of the plane 25—25 of FIG. 22.

FIGS. 27 and 28 reveal the mirror image structure of cutter 137' with cutting EDGE 321 of PROTRUSION 323 being slightly staggered relative to CUTTING EDGE 301 of CUTTER 137 to insure shearing of the STRIP or RIBBON 27'. Each RIDGE 303 and 323 extends halfway through the RIBBON 27' to make the "cut." The amount of stagger (or offset) of the protrusions should not exceed 10% of the thickness of strip 27, and becomes critical for thin material. The PROTRUSION POINTS (CUTTING EDGES) 301 and 321 should just touch.

The cut is an inclined linear cut, if the cutting edges are truly helical, but the real advantage fo this conical-helical structure lies in the fact that the cut is continuously progressive or gradually made rather than creating a sudden impact, as in many cutters. This is explained by the fact that the STRIP 27', being cut, is curved and the velocity of its edges traveling through the cutter cones are different. But the conical configuration of the cutter cones compensates for the different edge velocities, provided the movement of the strip is synchronized with the conical surface velocities, and the apex of the cutter cones is disposed at the center of the formed coil, as is shown in FIG. 11 for the forming cones 50, 51.

Thus, the helical cutting edges continuously and gradually sever the STRIP 27'. The peak driving force is spread out over the circumferential distance of the cutter edges, which could be configured to cover 360 degrees of the cutter cones to minimize impact.

It has been learned in practice that 45 degrees is usually sufficient for surface area to cut, and 60 degrees to form the helices.

Use of the cones establishes the same linear speed for both edges of the strip, and substantially improves over prior art cutters, such as U.S. Pat. No. 3,095,774, issued July 2, 1963 to B. F. Hart, and assigned to General Electric Company, which discusses cylindrical cutters having helical cutter edges, and while it reduces impact by gradual shearing, it cannot correlate edge speeds of a moving helical strip, and consequently, would not be of use in the present application, except for very narrow strips where the edge speeds would be substantially the same. Cylindrical cutters are adequate for conductor widths up to about one tenth of the outer diameter of the coil. Greater widths are better processed with conical cutters, and such a limitation is not tolerable where strips up to 25% of the outer helical radius in inches wide are cut for use in commercial cores. Also, custom jobs may require even wider strips.

The cylindrical cutter of the related patent is intended for use in helical strips for attachment to heat exchange surfaces and for "edge" wound alternating current stators as described in U.S. Pat. No. 3,283,399 to B. F. Hart, et al, issued Nov. 8, 1966, and assigned to General Electric Company.

Figure 29:
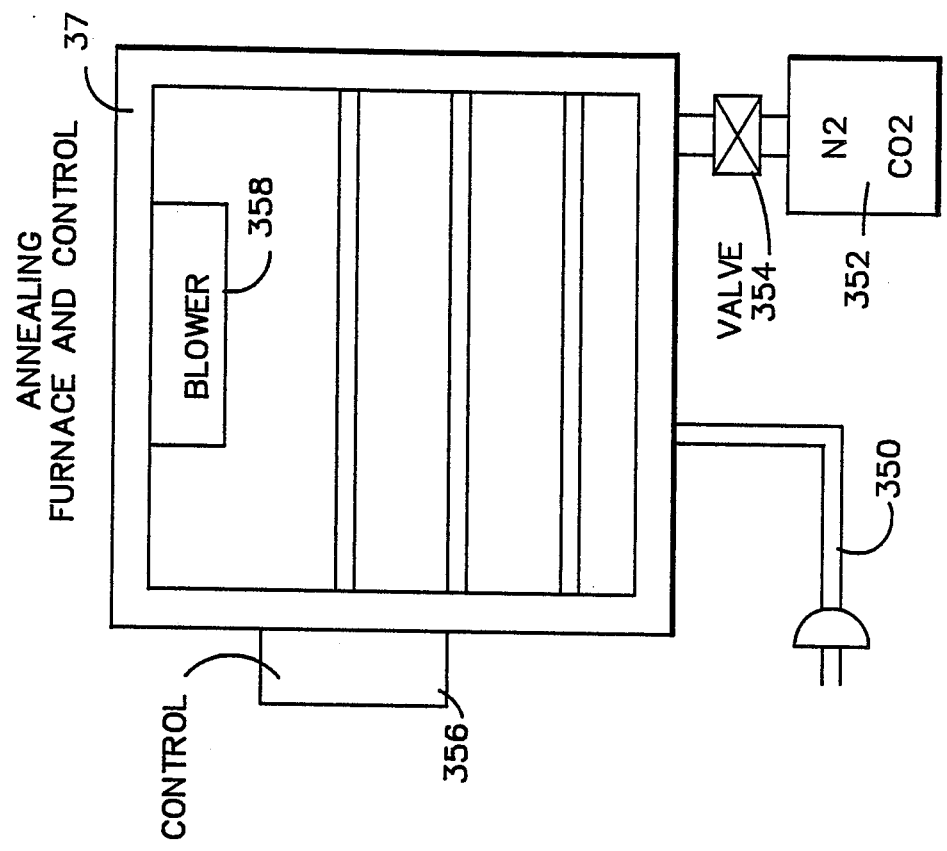
FIG. 29 shows a suitable annealing oven or furnace for the coils.

Once severing of an individual coil is accomplished, it is transferred to the ANNEALING FURNACE 37, shown in detail in FIG. 29, and in accordance with the process line of FIG. 6. These are commercially available and serve the purpose of rendering the coil strip 27' malleable so that the turns may be compressed or opened for tabbing or receiving insulating coating, and may be compressed to fit commercial cores. The interior of the FURNACE 37 is heated, as by gas flame or electrical power, over CORD 350, to raise the temperature of a batch of coils placed therein. To prevent oxidation of the exposed surfaces, TANK 352 of nitrogen, carbon dioxide or other inert gas is connected to the furnace by VALVE 354. CONTROL 356 is provided to control the annealing cycle, including timing wich may require up to 2 hours, depending upon the maximum temperature. BLOWER 358 simply circulates the heated air for uniform annealing.

After the coils have been annealed, they are ready to be tabbed by unrolling their ends, as illustrated at BLOCK 39 in FIG. 6.

FIGS. 30, 31A 31B, 31C, 32, 33, 34, 34A and 35 show various ways of forming integral tabs on the ends of the coil.

In FIG. 30, an apparatus capable of forming a straight tab from a coiled turn (more or less turn (s)), is shown. The COIL END 351, being formed into a tab, is shown in position to be pressed down into a conforming GROOVE OR TROUGH 703 formed by OUTER GUIDE 765, and FRAME 354 with base 767 (FIG. 34A) for TROLLEY 353. ROLLER or CAM FOLLOWER 355 presses down on the strip portion being unwound. This is because rollers 360 and 362, together with ROLLER 355, rigidly bound the groove receiving the COIL END 351 being unwound. The portion of the conductor in the TROUGH 703 is shown at 352 (FIG. 34A) as it is becoming a tab. A TROUGH or GROOVE 703 for receiving TAB 351 is also shown in FIG. 33 at 703, and while this is a different embodiment, such a trough is necessary to all embodiments in order that the tab is squeezed preferably by at least 10% in cross sectional area.

Figure 34A:
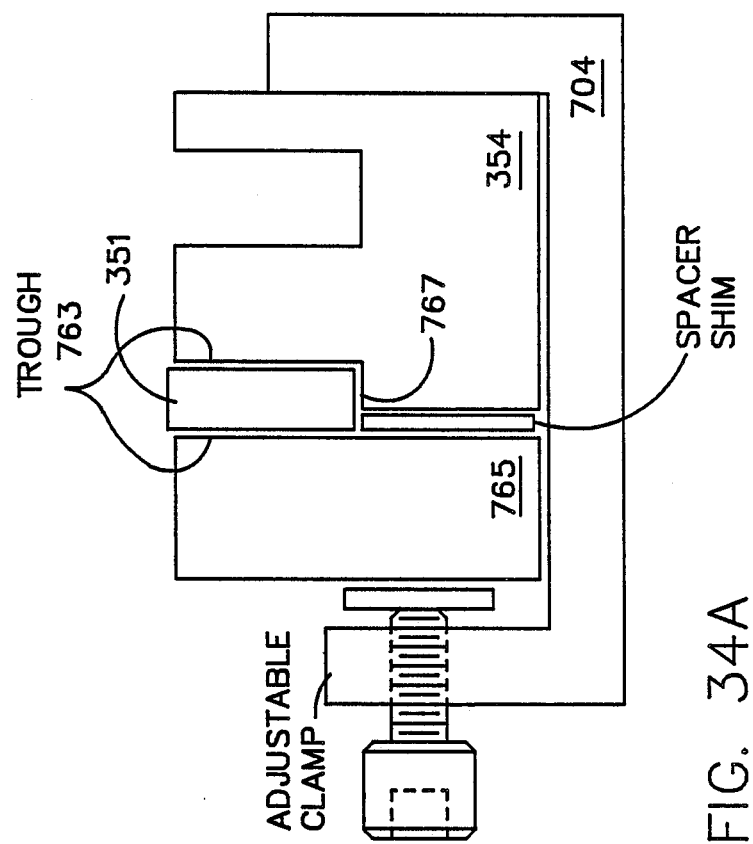
FIG. 34A is a detailed view of a coil gripping structure for use in either tabbing embodiment.

Returning to FIG. 30, the outer GUIDE PLATE 765 is visible as a portion of the TROUGH 703. While not shown in this figure, the loosely wound coil is gripped while terminal end 351 is unwound by roller 355. This is accomplished by ADJUSTABLE CLAMP 704 pressing OUTER GUIDE 765 against FRAME 353 (FIG. 34A).

Dotted TERMINAL END 400 of the CONDUCTOR END 351, is shown at 400 (FIG. 30) before it is processed by ROLLER 355 into the TROUGH 703 to unwind it and squeeze it, thereby forming a tab.

In FIG. 30, the STEP 401 is shown to control the exit position of the tab relative to the coil central axis. As seen in FIG. 31B, the TERMINAL PORTION 351 is being unrolled along a substantially radial direction from the coil.

This is accomplished by providing a MOTOR 410 (FIG. 30), coupled by CHAIN 412 to a SPROCKET 414 for continuous rotation. A GRIPPER 416, attached to the TROLLEY 353, is provided with a thumb actuated DEVICE 418 for causing manual engagement with CHAIN 412, through PIVOT 421.

A drag load is transmitted from the TROLLEY 353, via GRIPPER 416, to the CHAIN 412 as the pressure roller while CAM FOLLOWER 750 (FIG. 33) forms the tab in SLOT 763. The GRIPPER ARM 419 is operated, in tension, dragging TROLLEY 353 until the PRESSURE ROLLER 355 passes the END of the available TAB MATERIAL 352. Thus, the TROLLEY 353 unrolls and compresses the coil END 351 to form an integral tab.

Engagement of GRIPPER 416 with a chain link transmits the tensile load in the GRIPPER ARM 419 to the chain link. The load is sufficient to hold the gripper leading SLOT EDGE 420 fixed in its engagement until the pressure roller passes the END of the TAB MATERIAL 352. As the end of the TURN 352 is passed by PRESSURE ROLLER 355, tension in GRIPPER ARM 416 is automatically removed, and the trolley being free to roll on the TROLLEY RECEIVING FRAME 375, advances to the left, slightly in advance of CHAIN 412 movement, thereby removing the frictional load holding gripper leading edge engaged with a chain link.

Removal of this load permits SPRING 423 to instantly raise the GRIPPER 416 from its position of engagement with the chain link to a position free of the chain without additional mechanical complexity for release.

The tab formation is accomplished with a time interval measured in seconds and tenths of seconds. Release of GRIPPER 416 from engagement allows the operator to manually position the trolley to the right in preparation for insertion of the next coil for tab formation.

FIG. 34A shows a suitable structure for gripping the coil to hold it while the end is being unrolled. Adjustable CLAMP 704 tightens outer GUIDE 765 against a TURN 352 and MAIN FRAME 354. This structure is the same for both FIGS. 30 and 32.

The orientation of the finished tab relative to the coil central axis is shown in FIGS. 31A through 31C. In FIG. 31A the EXTREMITY 351 is bent around STEP 401 of FRAME MEMBER 354 at an angle in between tangential and substantially normal to the coil, the reference numeral 19 indicating the curvature, as shown in FIG. 1, where the bending action takes place. SURFACE 354' of FRAME 354 supports the coil in front of STEP 401.

In FIG. 31B, the STEP 401 of FRAME MEMBER 354 is made shallower compared to the height of the coil, and the TAB 351 emerges at a different offset.

Similarly, in FIG. 31C the STEP 401 of FRAME MEMBER 354 is reduced further and the integral TAB 351 approaches a tangential relationship to the coil.

Figure 34:
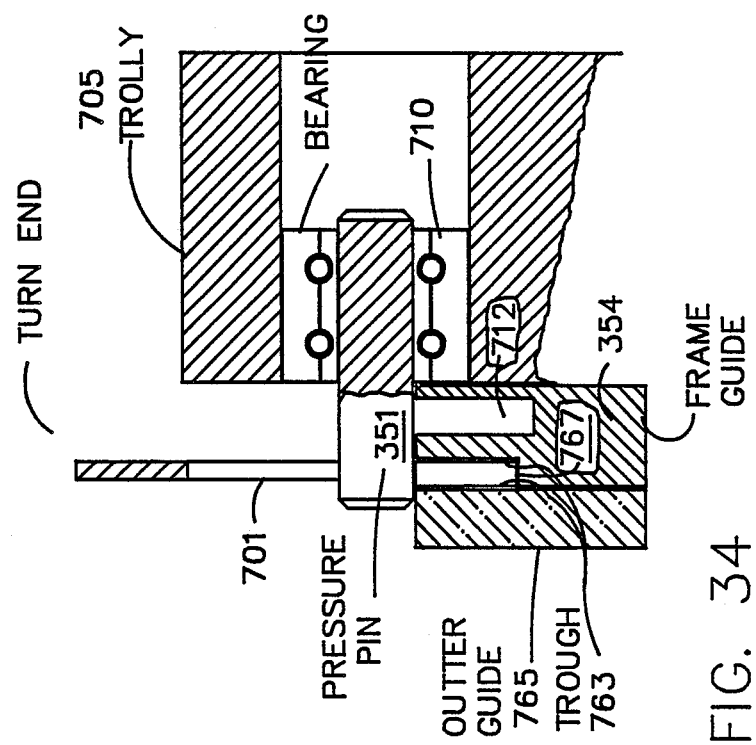
FIG. 34 is an alternate embodiment of the tabler.

In FIG. 34, an alternate tabber embodiment is shown wherein a PRESSURE ROLLER PIN 700, of TROLLEY 705, is inserted into the opening 701 of the coil. The coil is gripped by OUTER GUIDE 765, being pressed against a TURN 352 at a point not being unrolled. The TROUGH 763 is stationary and the TROLLEY 705 moves PRESSURE ROLLER PIN 700 down a track to form the tab. BEARING 710 permits the PRESSURE ROLLER PIN 700 to rotate as necessary in the tabbing operation. Thus, no cam follower is necessary and the bearing may be roller, ball, needle, or other, and even adjustable for wear.

EXTRA SLOT 712 is provided for the extremity of the tab, when the coil is gripped by the second or third turn, preparatory to the tabbing operation.

FIGS. 32 and 33 show further details of the embodiment (of FIG. 30) of tabber mechanism employing the conventional CAM FOLLOWER 750, carrying roller 355 supported by PIN 755 to unroll the EXTREME ENDS 351 of the coil to form a tab. TROLLEY 353 moves relative to FRAME GUIDE 354 to unroll the tab and pressure form it to a different dimension by virtue of slot 763 formed between OUTER GUIDE 765 and FRAME GUIDE 354. EXTRA SLOT 712 is also provided in this embodiment.

ROLLERS 360 and 362 make rigid contact with the bottom of the FRAME GUIDE 354, and CAM FOLLOWER ROLLER 355 makes the pressure contact with the top of GUIDE 354 to reduce the cross sectional area of the TURN 352 by approximately 10% due to elongation of the same.

In FIG. 32, STEP 401 is shown to control the location of the tab being formed, as previously explained. Of course, OUTER GUIDE 765 is clamped against FRAME MEMBER 354 to grip the coil and maintain it against the STEP 401.

FIG. 35 shows a TURN END GUIDE 800 for insuring that the coil TURN END 351 is guided down into RECEIVING SLOT 802 straight without folding or twisting, as the turn is unwound by ROLLER OR PIN 355. Note the rearward tips 814 which nestle in the curvature of ROLLER 355, without interference. GUIDE 800 moves with the TROLLEY 353 just ahead of ROLLER 355.

In summary, the tabbing station confines the TAB 352 (FIG. 33) in SLOT or TROUGH 763 with respect to its sides and bottom, although the SLOT 763 is slightly wider than the turn and the turn is slightly higher than the slot. Then ROLLER 355 depresses the top to cause thickening and elongation of the tab being formed while the cross section changes. The compressed tab fills the slot so tightly that it is necessary to loosen the outer guide to remove it.

In FIG. 33, the forward portion of TURN END 352 is shown dotted because it is ahead of ROLLER 355, and has not yet been compressed into the TROUGH 763.

Also, in order to load the coil onto the tabber, it is desirable to remove ROLLER 355 to slide TURN END 351 into TURN END GUIDE SLOT 802.

In FIG. 36, there is shown a numbering station or decal BLOCK 901, which is conventionally available and simply identifies the coils being processed.

In FIG. 37, BLOCK 903 designates a conventional coating station which is schematically depicted to show the COILS 905 deployed adjacent to NOZZLE 907 which blows powder, under power of AIR SUPPLY 911 onto the COILS 905. Electrostatic attraction is employed to draw or attract the power to the NAKED COILS 905 and cause it to stick. This station is available from Volstatic, Inc., 7960 Kentucky Drive, Florence, Ky., 41042, as advertised in their bulletin No. 1000. The powder is an epoxy compound available in accordance with recommendations from Volstatic.

While the epoxy coating is a sufficient insulator, additional insulative and or potting material may be applied to the finished coil products. One such material is an insulating varnish of the Monsanto Company trademarked as ISONEL 31 insulating varnish. Also thin insulating washers or spacers may be applied between the coil and the core if desired.

In FIG. 38, a conventionally available BAKE OVEN 915 is shown for fixing the epoxy applied to COILS 905 from the preceding station, FIG. 37, again this accomplished by a conventional operation.

In FIG. 39, there is shown a BENCHMASTER PUNCH PRESS ARRANGEMENT 921 for compressing the helix into HELICAL COIL FORM 923 through the application of force to reduce the coil dimensions to fit the commercially available cores. This press includes a CORE FORM OR DIE 931 which is a guide for the 5 ton plunger 933 in order to maintain the coil configuration as it is smashed.

These latter stations are identified by the processing BLOCK 41 of FIG. 6. TESTING STATION 43 may actually encompass electrical tests subsequent to the finishing of the product.

PACKAGING AND SHIPPING BLOCK of FIG. 6 is provided to supply the fully formed and insulated coil as a product or to incorporate it into a core to meet the specifications of a purchaser.

A further feature of the invention resides in the fact that the apparatus herein depicted and described is capable of driving forward or in reverse to produce right handed coils and left handed coils. If the COIL 11 of FIG. 1 is held with the closest TAB 16 pointing up, this tab appears on the right, and the coil is called a right handed coil. Notice that the turns follow a clockwise direction. Thus, to screw a right handed coil into a right handed coil, clockwise rotation is employed.

A left handed coil would have its closest tab pointing upward on the left hand side of the coil and its turns would follow a counter clockwise direction. Thus, counter clockwise rotation is employed to screw a left handed coil into a left handed coil.

Figure 40:
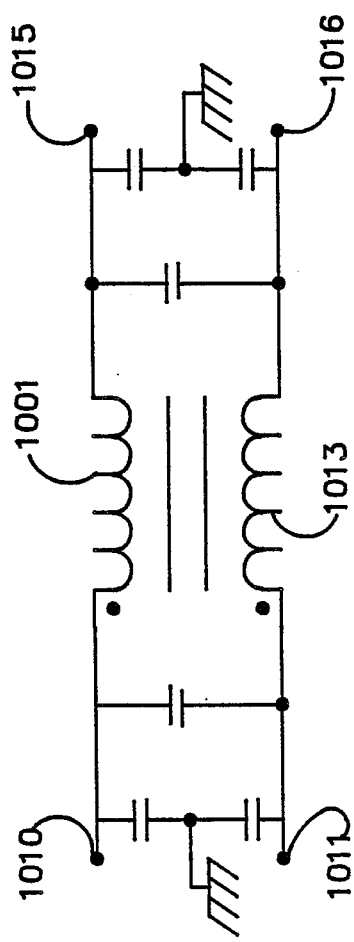
FIG. 40 is an electrical schematic of the power filter circuit of FIGS. 41 and 42.
Figure 42:
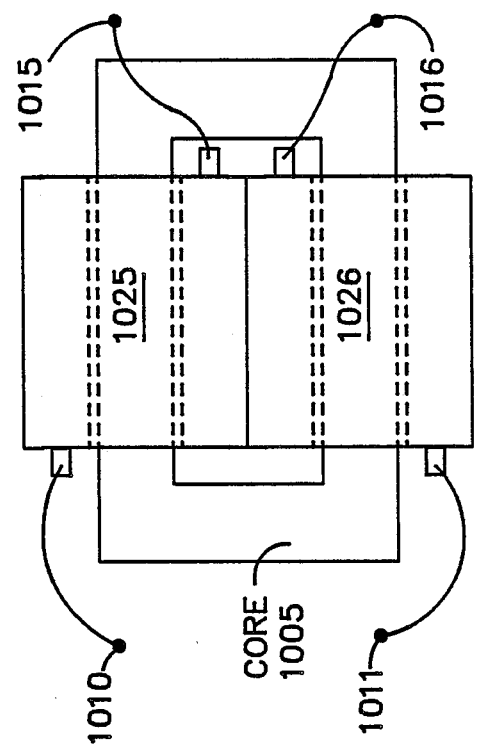
FIG. 42 shows the improved wiring topology obtained by employing right and left handed polarity coils; and, FIG. 43 shows the structure of FIG. 14 in mirror image for forming coils of opposite hand.
Figure 41:
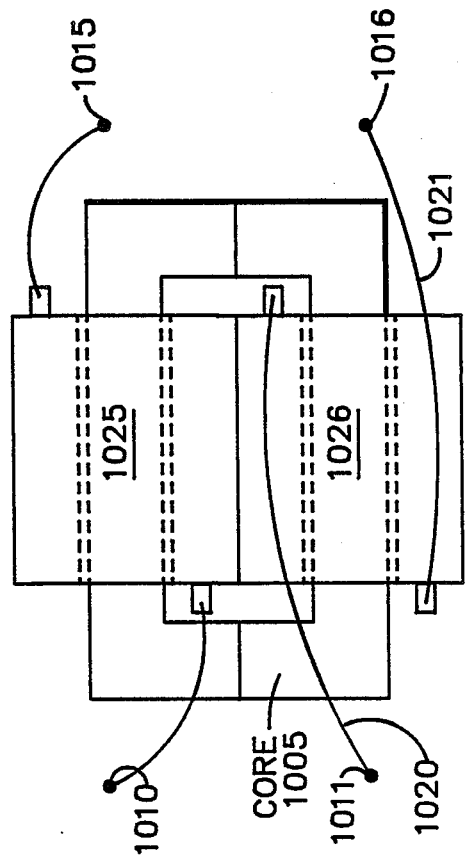
FIG. 41 shows the coil structure using like handed coils having like polarity.

One application for both left handed and right handed coils is discussed relative to FIGS. 40, 41 and 42.

FIG. 40 shows COILS 1001 and 1003, produced by the method and apparatus herein, used in a power line filter circuit which would be used on 60 cycle or 400 cycle, single phase, and they can be applied to three phase lines.

In FIG. 41, these coils are shown assembled on CORE 1005, as two right hand coils, and in order to be connected in the dot polrization pattern of FIG. 40, between INPUT TERMINALS 1010 and 1011 and OUTPUT TERMINALS 1015 and 1016, long awkward LEADS 1020 and 1021 from TABS 1022 and 1023 are necessitated, resulting in heat and attendant lost power.

The use of a LEFT HAND COIL 1025 and RIGHT HAND COIL 1026, as in FIG. 42 provides a much more efficient and reliable arrangement.

Figure 43:
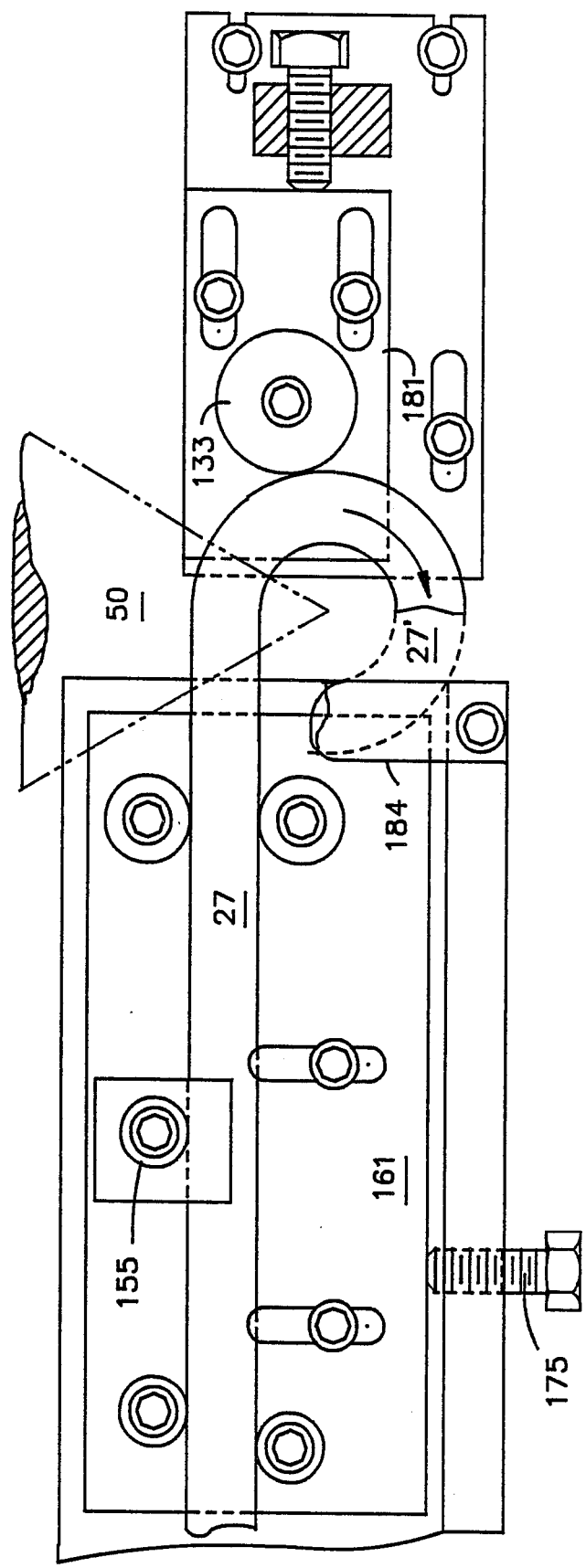

In conclusion, all coils depicted throughout the drawings are right handed coils. To convert to the production of left handed coils, all that is necessary is to:

1. change the direction of the input drive of CHAIN DRIVE 55 in FIG. 7. This may be achieved by moving a switch (not shown) to reverse ON tne AC motor (also not shown) DRIVING CHAIN 55; and 2. introduce the input STRIP 27 to CONES 50, 51 (FIGS. 7 and 14) from the opposite side (FIG. 43).

It should also be noted that the clutch of FIG. 16 is already arranged to drive forward or reverse automatically, and since the CUTTER DRIVE GEAR 201 (FIG. 7) automatically reverses the direction of ROTATING SHAFT 203, nothing FURTHER there is required. The electrical control circuitry is similarly automatically operated in either mode.

All that remains is to show the input guiding arrangement for controlling INPUT STRIP 27. It is simply a mirror image of FIGS. 14 and 15, or in fact the structure of 10 FIGS. 14 and 15 may be rotated through an angle of 180 degrees. Such a structure is shown in FIG. 43. The subject arrangement is capable of forming and severing up to four coils per minute.

I claim:

1. Apparatus for making helical coil magnetic inductors having integral tabs comprising in combination:
    means for forming a ribbon-like conductor having a trapezoidal cross section into a helical coil having turns of substantially rectangular cross section;
    means for integrally tabbing the coil ends by unrolling terminal portions of one or more turns from each end while partially confining the turn portion as it is being unrolled to control the cross sectional area thereof while forming the integral tabs with a decreased width and cross-sectional area relative to the width and cross-sectional area of said helical turns;
    means for heating treating the coil to render the coil turns malleable;
    means for coating the coil; and,
    means for compressing said coil following the coating step such that a coil of n+1 turns occupies a height of approximately n turns.

2. Apparatus for forming helical coil magnetic inductors from a ribbon conductor, comprising:
    means for drawing the conductor from a source of supply comprising a pair of spaced apart conical rollers to shape it into a relatively open coil of helical turns having a rectangular cross section, said open coil having two end portions;
    means for cuting the so-formed moving conductor coil from the supplied and formed conductor at a selectible number of turns;
    trough means;
    means for forming said end portions into unwound elongated integral tabs by unrolling said portion into said trough means having a cross sectional area of less than the cross sectional area of a turn and forming elongated tabs having a decreased width and cross-sectional area relative to the width and cross-sectional area of said helical turns.
    means for insulating the coil and its turns from each other; and,
    means for compressing the coil to reduce its height so it will fit into a conventional core.

3. The apparatus of claim 2, wherein:
    said conductor is drawn between the opposing surfaces of said conical rollers with its top surface in contact with one roller and its bottom surface in contact with the other roller; and,
    means for deflecting the conductor after it exits said pair.

4. The apparatus of claim 2 wherein:

said trough means is further characterized to have a cross sectional area for reducing the cross sectional area of a turn,
by approximately 10%, said ends being decreased in width by elongation to allow the formed tabs to be received in exit core openings of conventionally available cores.

5. The apparatus of claim 2, wherein:
the means for cutting is provided with helical cutting edges for shearing the ribbon.

6. The apparatus of claim 5, wherein:
said helical cutting edges are staggered to effect said shearing.

7. The apparatus of claim 2 further comprising:
means for confining the open coil emerging from the pair of conical rollers to insure a constant diameter helical coil.

8. The apparatus of claim 2 for forming right hand and left hand coils, comprising:
means for forming a first coil by causing said ribbon conductor to enter the first pair of conical rollers from a first direction with one each of the pairs of conical rollers turning in a clockwise direction and the other each turning in a counter clockwise direction, when viewed from their apecies;
means for forming a second coil by reversing the ribbon conductor entry to a path 180 degrees removed from the first direction; and,
means for reversing the direction of all rollers to form said second coil wherein one of said coils is a right hand coil and the other of said coils is a left hand coil.

9. The apparatus of claim 2 for forming right hand and left hand coils, comprising:
means for directing the ribbon conductor through the pair of conical rollers from a first direction with one each of the pairs of said rollers rotating in a clockwise direction, as viewed from their apecies to form one of said coils; and,
means for reversing the direction of all rollers so said one rollers are turning counterclockwise, and,
means for directing the ribbon conductor through the pair of rollers from the direction opposite to said first direction to form the other of said coils.

10. An apparatus for making helical coil magnetic inductors, comprising in combination:
means for forming a continuous ribbon-like conductor into an edge wound multi-turn helical coil having two end portions each comprising part of a turn, a turn, or more than a turn;
said means for forming comprising means for receiving a continuous conductor having a wedge shaped cross section and changing the conductor cross section into a continuous rectangular shape;
said means for receiving further edge winding said rectangular shaped conductor into a helical coil; and,
means for forming said end portions into unwound elongated integral tabs by unrolling part of a turn, a turn, or more than a turn in a manner to form elongated tabs having a decreased width and cross-sectional area relative to the width and cross-sectional area of said helical turns.

11. The apparatus of claim 10 further comprising:
means for annealing at least the coil to provide malleability of the turns thereof; and
means for coating at least the coil to insulate each turn thereof.

12. The apparatus of claim 11 wherein,
said means for forming the conductor into a coil is comprised of a pair of conical rollers having adjacent conical surfaces in spaced parallel relation, with the coil external radius equal to the width of the wedge shaped conductor and the extension distance of the non-parallel sides of the conductor to a point of intersection; and,
the apices of said cones being deployed substantially at the center of the coil being formed.

13. The apparatus of claim 12 further comprising:
means for adjusting the path of travel of said conductor which is passed between said conical rollers with the thickest edge of the conductor spaced from the tip of the rollers a distance approximately equal to the radius of the resultant helical coil.

14. The apparatus of claim 12, wherein:
the means for forming said integral tabs comprise a gripping station for holding the coil and a relative motion section for unrolling said part of a turn, a turn, or more than a turn.

15. The apparatus of claim 12, wherein:
the means for forming the coil comprises a source for supplying the conductor;
means for counting the turns being formed; and
means for cutting the coil from said source upon a predetermined number of turns or turns plus partial turns.

16. The apparatus of claim 12, further comprising:
means for compressing said coil following the coating step such that a coil of n+1 turns occupies a height of approximately n turns.

17. Apparatus for forming integral tabs on the ends of continuous helical coil magnetic inductors having a continuous rectangular shape and having a plurality of turns comprising, in combination:
means for gripping the coils;
means for unrolling at least one end turn or a portion thereof or turns of a gripped coil while applying pressure thereto; and,
means for confining the turn or a portion thereof or turns being unrolled to reduce the cross-sectional area of the turns being unrolled by said pressure causing expansion thereof into a guide in a manner elongated to form tabs having a decreased width and cross-sectional area relative to the width and cross-sectional area of said helical turns.

18. The method for forming integral tabs on the ends of helical coil magnetic inductors having a continuous rectangular cross section and a plurality of turns, comprising the steps of:
gripping the coil;
unrolling at least a portion of one end turn or the end turn or turns of a gripped coil while applying pressure thereto; and,
confining the portion, turn, or turns being unrolled to reduce the cross-sectional area of the portion, turn, or turns by said pressure causing elongation thereof in a manner to form elongated tabs having a decreased width and cross-sectional area relative to the width and cross-sectional area of said helical turns.

* * * * *